United States Patent
Wake et al.

(10) Patent No.: US 9,774,048 B2
(45) Date of Patent: Sep. 26, 2017

(54) FUEL CELL VEHICLE AND MOVING BODY

(71) Applicant: HONDA MOTOR CO., LTD., Tokyo (JP)

(72) Inventors: Chihiro Wake, Saitama (JP); Koichi Takaku, Saitama (JP)

(73) Assignee: HONDA MOTOR CO., LTD., Tokyo (JP)

( * ) Notice: Subject to any disclaimer, the term of this patent is extended or adjusted under 35 U.S.C. 154(b) by 549 days.

(21) Appl. No.: 14/219,389

(22) Filed: Mar. 19, 2014

(65) Prior Publication Data

US 2014/0295305 A1 Oct. 2, 2014

(30) Foreign Application Priority Data

Mar. 27, 2013 (JP) ................................. 2013-067546

(51) Int. Cl.
*H01M 8/04* (2016.01)
*H01M 8/04223* (2016.01)
(Continued)

(52) U.S. Cl.
CPC ......... *H01M 8/04223* (2013.01); *B60L 1/003* (2013.01); *B60L 11/1883* (2013.01);
(Continued)

(58) Field of Classification Search
CPC ......... H01M 8/04201; H01M 8/04223; H01M 8/04225; H01M 8/04228
See application file for complete search history.

(56) References Cited

U.S. PATENT DOCUMENTS

| 7,988,926 B2 | 8/2011 | Schmidt-Ihn et al. |
| 2006/0152085 A1* | 7/2006 | Flett .......................... B60L 9/30 307/75 |

(Continued)

FOREIGN PATENT DOCUMENTS

| DE | 10 2006 020 392 A1 | 10/2007 |
| DE | 10 2009 030 358 A1 | 12/2010 |

(Continued)

OTHER PUBLICATIONS

German Office Action application No. 102014205394.3 dated Nov. 20, 2014.

*Primary Examiner* — Nicholas A Smith
(74) *Attorney, Agent, or Firm* — Squire Patton Boggs (US) LLP

(57) ABSTRACT

A data signal accurately reflecting the actual state of a storage vessel is sent to a station side. A fuel cell system (1) includes a hydrogen supply line (32) that connects a tank main body (311) and a fuel cell stack (2), and a main stop valve provided to the hydrogen supply line (32). A communicative filling system (6) generates a data signal based on the state of a hydrogen tank (31), and sends the generated data signal to a station (9). A vehicle (V) includes an FCV-ECU (11) that assumes processing related to control of the fuel cell system (1), and a communicative filling ECU (61) that assumes processing related to control of the communicative filling system (6). Then, the communicative filling ECU inhibits start of communication with the station (9) at least when determined that a main stop valve (312) is in a completely closed state.

11 Claims, 10 Drawing Sheets

(51) Int. Cl.
    *H01M 8/04228*     (2016.01)
    *H01M 8/04089*     (2016.01)
    *H01M 8/04082*     (2016.01)
    *H01M 8/0432*     (2016.01)
    *H01M 8/0438*     (2016.01)
    *B60L 1/00*     (2006.01)
    *B60L 11/18*     (2006.01)

(52) U.S. Cl.
    CPC ... *H01M 8/04089* (2013.01); *H01M 8/04201* (2013.01); *H01M 8/04228* (2016.02); *H01M 8/04373* (2013.01); *H01M 8/04425* (2013.01); *H01M 2250/20* (2013.01); *Y02T 90/16* (2013.01); *Y02T 90/32* (2013.01); *Y02T 90/34* (2013.01)

(56) References Cited

U.S. PATENT DOCUMENTS

| | | | |
|---|---|---|---|
| 2009/0095016 A1 | 4/2009 | Schmidt-Ihn et al. | |
| 2010/0183936 A1* | 7/2010 | Osborne | H01M 8/04014 429/439 |
| 2012/0125482 A1* | 5/2012 | Mori | F17C 5/007 141/98 |
| 2013/0008533 A1* | 1/2013 | Kato | H01M 10/48 137/551 |

FOREIGN PATENT DOCUMENTS

| | | | |
|---|---|---|---|
| DE | 102009030358 A1 * | 12/2010 | ........ H01M 8/04201 |
| DE | 11 2010 003 119 T5 | 3/2013 | |
| JP | 2003-115317 A | 4/2003 | |
| JP | 2011-033068 A | 2/2011 | |
| WO | 2011/012937 A1 | 2/2011 | |

\* cited by examiner

FUEL CELL VEHICLE AND MOVING BODY

This application is based on and claims the benefit of priority from Japanese Patent Application No. 2013-067546, filed on 27 Mar. 2013, the content of which is incorporated herein by reference.

BACKGROUND OF THE INVENTION

Field of the Invention

The present invention relates to a fuel cell vehicle and a moving body. In more detail, it relates to a fuel cell vehicle and moving body equipped with a storage vessel that stores fuel gas, and a transmitter that transmits a data signal generated based on the state of the storage vessel to an external filling device.

Related Art

Fuel cell vehicles are equipped with a fuel cell system as an electrical power source system thereof. Fuel cells generate electric power when hydrogen gas that is the fuel gas and air that is an oxidizing gas are supplied thereto. In order to supply hydrogen gas to a fuel cell, a hydrogen tank is connected to the anode flow channel of the fuel cell via a hydrogen gas supply line. In addition, in order to supply air to the fuel cell, a compressor is connected to the cathode flow channel of the fuel cell via an air supply line. The fuel cell system starts the supply of hydrogen gas and air when being started up, and starts electric power generation by way of the fuel cell.

During stop of the system, if oxygen remains as is inside the cathode flow channel, the cathode side of the fuel cell will enter a high potential state when supplying hydrogen to the anode system during a subsequent system startup, and the solid polymer electrolyte membrane of the fuel cell may deteriorate. For this reason, with fuel cell systems, the system is made to completely stop upon electric power generation by the fuel cell and discharge continuing using the oxygen remaining inside of the cathode flow channel during stop of the system so as to establish the fuel cell in an inactive state (refer to Patent Document 1 (Japanese Unexamined Patent Application, Publication No. 2003-115317)). In addition, in order to further suppress oxygen permeation from the cathode side to the anode side, in this discharge processing, it has been known to be preferable to consume remaining oxygen on the cathode side and supply hydrogen gas in surplus from the hydrogen tank to the anode side so as to raise the pressure inside the anode flow channel.

On the other hand, in recent years, research has been actively advancing in technology for filling hydrogen gas into a hydrogen tank. For example, in the technology of Patent Document 2 (Japanese Unexamined Patent Application, Publication No. 2011-33068), when the hydrogen filling device of a hydrogen station and a fuel cell vehicle are connected and hydrogen gas is filled into the hydrogen tank thereof, data signals related to the temperature, pressure, etc. of the tank are sent from the vehicle side to the station side. At the station side, the initial state of the hydrogen tank is grasped based on the received data signals, an optimum hydrogen gas filling mode is decided based on this initial state, and hydrogen gas is filled according to this filling mode. Technology for filling hydrogen gas based on communication between the vehicle side and station side in this way is referred to hereinafter as communicative filling.

SUMMARY OF THE INVENTION

The above-mentioned discharge processing is a processing that is continuously carried out even after the system stop operation, upon the event of a system stop operation by the user. Then, filling of hydrogen gas is processing that is carried out based on the intention of the user, after the system stop operation. Therefore, while the discharge processing is being carried out after the system stop operation, it is possible that the operation to fill hydrogen gas is carried out; however, it has not been sufficiently considered which process to be carried out in priority in such a case, in what kind of state to carry out both processing in parallel, or the like. For example, if coming to perform the discharge processing in parallel with communicative filling, the state of the hydrogen tank will fluctuate, accurate data relating to the state of the hydrogen tank will not be able to be transmitted from the vehicle side, and excess time may be required in filling and complete filling may become impossible. Due to the fact that the station often decides a subsequent filling mode based on the data signals sent from the vehicle side at the time of the start of communicative filling, particularly at the time of starting communicative filling, it is necessary to send data signals accurately reflecting the state of the tank at this time in order to achieve quicker complete filling.

The present invention has an object of a fuel cell vehicle or moving body including a storage vessel that stores fuel gas and a communicative filling system that sends data signals related to the state of the storage vessel to an external unit, whereby data signals that accurately reflect the actual state of the storage vessel are sent to the station side so as to enable quick complete filling.

According to a first aspect, a fuel cell system (e.g., the fuel cell system 1 described later) includes: a fuel cell system (e.g., the stack 2 described later) including a fuel cell that generates electric power when fuel gas and an oxidant gas are supplied thereto, a storage vessel (e.g., the hydrogen tank 31 and tank main body 311 thereof described later) that stores fuel gas, a fuel gas supply line (e.g., the hydrogen supply line 32 described later) that connects the storage vessel and the fuel cell, and an on-off valve (e.g., the main stop valve 312 described later) provided to the fuel gas supply line. A communicative filling system (e.g., the communicative filling system 6 described later) includes a signal generation device (e.g., the data signal generation unit 611 of the communicative filling ECU 61 described later) that generates a data signal based on a state of the storage vessel, and a transmitter (e.g., the infrared transmitter 66 described later) that sends a data signal generated by the signal generation device to an external filling device (e.g., the hydrogen station 9 described later) that fills fuel gas to the storage vessel. A fuel cell vehicle (e.g., the fuel cell vehicle V described later) includes: the fuel cell system; the communicative filling system; a fuel cell system control unit (e.g., the FCV-ECU 11 described later) that executes fuel cell system processing related to electric power generation by the fuel cell, and startup and stop of the fuel cell system; a communicative filling system control unit (e.g., the communicative filling ECU 61 described later) that executes processing related to communication with the external filling device by the communicative filling system; and an on-off valve state determination unit (e.g., the main stop valve state determination unit 619 of the communicative filling ECU 61, main stop valve sensor 317, etc. described later) that determines whether the on-off valve is an opened state or closed state, in which the fuel cell system control unit and the communicative filling system control unit are intercommunicable, and the communicative filling system control unit inhibits start of communication with the external filling device by the transmitter when determined by way of at least the on-off valve state determination unit as being the opened state.

According to a second aspect, in this case, it is preferable for the fuel cell vehicle to include: a fuel introduction part (e.g., the hydrogen feed port 82 described later) to which a fuel filler nozzle (e.g., the hydrogen filler nozzle 93 described later) of the external filling device is connected; a fuel introduction line (e.g., the hydrogen introduction line 313 described later) that connects the fuel introduction part and the storage vessel; and an accepting mechanism (e.g., filling shutoff valve 316) that is provided in the fuel introduction line, and accepts or rejects supply of fuel gas from the external filling device to the storage vessel, in which the communicative filling system control unit accepts supply of fuel gas by the accepting mechanism in a case of a predetermined non-communicative filling start condition being satisfied while communication by the transmitter is being inhibited, and permits non-communicative filling allowing fuel gas to be filled at a predetermined flow rate by the external filling device while inhibiting communication by the transmitter.

According to a third aspect, in this case, it is preferable for sending the data signal from the transmitter to the external filling device and filling fuel gas to the storage vessel in a mode decided based on the data signal from the external filling device to be defined as communicative filling; the communicative filling system control unit to monitor a state of the storage vessel while performing the communicative filling, determine whether being filled in a specific mode, and start abort processing to cause the communicative filling to be interrupted in a case of determining as being filled in a mode different from the specific mode; and the communicative filling system control unit to be inhibited from transitioning from an operable state to an inoperable state, in a case of there being a possibility of the abort processing being executed or a case of executing the abort processing.

According to a fourth aspect, in this case, it is preferable for the fuel cell vehicle to further include: a pressure sensor (e.g., the tank pressure sensor 64 described later) that detects a pressure of the storage vessel; and a temperature sensor (e.g., the first tank temperature sensor 62 and second tank temperature sensor 63 described later) that detects a temperature of the storage vessel, in which detection signals of the pressure sensor and the temperature sensor are inputted only to the communicative filling system control unit, and the communicative filling system control unit sends the detection signal or a signal generated based on the detection signal to the fuel cell system control unit.

According to a fifth aspect, in this case, it is preferable for the fuel cell vehicle to further include a system startup request device (e.g., the ignition switch IG described later) that generates a startup request signal for the fuel cell system, in which the communicative filling system control unit ends communicative filling during execution and the fuel cell system control unit begins startup of the fuel cell system in a case of the startup request signal occurring while performing the communicative filling.

According to a sixth aspect, a power generation system includes: a power generation device that generates power using fuel gas, a storage vessel that stores fuel gas, a fuel gas supply line that connects the storage vessel and the power generation device, and an on-off valve provided to the fuel gas supply line. A communicative filling system includes: a signal generation device that generates a data signal based on a state of the storage vessel, and a transmitter that sends a data signal generated by the signal generation device to an external filling device that fills fuel gas into the storage vessel. A moving body includes: the power generation system; the communicative filling system; a power generation system control unit that executes processing related to startup and stop of the power generation system; a communicative filling system control unit that executes processing related to communication with the external filling device by way of the communicative filling system; and an on-off valve state determination unit that determines whether the on-off valve is an opened state or closed state, in which the power generation system control unit and the communicative filling system control unit are intercommunicable, and the communicative filling system control unit inhibits start of communication by the transmitter when determined as being the opened state at least according to the on-off valve state determination unit, except while filling fuel gas from the external filling device to the storage vessel.

(1) With the present invention, in the case of determining that the on-off valve is the opened state, i.e. in the case of being a state in which fuel gas inside of the storage vessel flows out towards the fuel cell, and the state inside of the storage tank can fluctuate, the communicative filling system control unit inhibits the start of communication with the external filling device by the transmitter. Therefore, as long as the on-off valve is opened, communicative filling will not start without a data signal being sent from the vehicle side to the external filling device side. It is thereby possible to prevent communicative filling from beginning based on a data signal in which the actual state of the storage vessel is not accurately reflected. In addition, by preventing a data signal in which the state of the storage vessel is not accurately reflected from being sent at the time of the start of communicative filling, it is possible to prevent time more than necessary from being taken in communicative filling, and communicative filling ending without having been able to completely refill.

(2) It is difficult for the user to visually confirm if the on-off valve is the opened state or the closed state from outside of the fuel cell vehicle. Therefore, in a case of inhibiting communication by the communicative filling system due to the on-off valve being the opened state, and consequently the start of communicative filling as described above, it is difficult for the user to grasp the reason why it is not possible to perform filling of fuel gas. In other words, when a filling start request arises by the user connecting the fuel filler nozzle to the fuel introduction part, or the like, if the filling of fuel gas is not started by the on-off valve being in the opened state, the user may feel a sense of discomfort. With the present invention, in a case of a predetermined filling start request arising while determined as a state in which the on-off valve is opened, and thus start of communication by the transmitter is being inhibited, the supply of fuel gas from outside is accepted by the accepting mechanism to permit non-communicative filling. It is thereby possible to reduce the aforementioned such sense of discomfort of the user, since even when not performing communicative filling, the user can perform non-communicative filling, in the case of a state in which communication with the external filling device by the communicative filling system is inhibited being prolonged.

(3) With the present invention, the communicative filling system control unit monitors the state of the storage vessel while performing communicative filling, and in a case of determining as filling in a mode different from a specific mode, starts abort processing to cause communicative filling to be interrupted. The communicative filling system control unit is inhibited from transition from an operable state to an inoperable state in a case of there being a possibility of this abort processing being executed (for example, a case of communicative filling still not completing) or a case of executing abort processing. It is thereby possible for abort processing to finish reliably, and then establish the communicating filling system control unit in an inoperable state.

(4) Detection signals of the pressure sensor and temperature sensor for grasping the state of the storage vessel are inputted only to the communicative filling system control unit. In addition, the detection signals of these sensors, or signals generated based on the detection signals are inputted to the fuel cell system control unit through the communicative filling system control unit. Wiring to connect the fuel cell system control unit with the pressure sensor and temperature sensors thereby becomes unnecessary. In addition, in the case of performing communicative filling by way of the communicative filling system control unit, although the detection signals of these sensor are necessary in order to generate data signals indicating the state of the storage vessel, it is possible to perform communicative filling by way of only the communicative filling system control unit without starting up the fuel cell system control unit separately, by inputting these detection signals to the communicative filling system control unit. Therefore, it is possible to reduce the consumption of electric power involved in communicative filling.

(5) With the present invention, in the case of the startup request signal for the fuel cell system arising while performing communicative filling, the communicative filling system control unit ends communicative filling during execution, and the fuel cell system control unit initiates startup of the fuel cell system. In other words, startup of the fuel cell system is prioritized over continuation of communicative filling. It is thereby possible to raise the convenience to the user. It should be noted that startup of the fuel cell system is processing accompanying valve opening of the on-off valve. Therefore, in the case of executing startup of the fuel cell system and communicative filling in parallel, there is concern over an erroneous data signal in which the state of the storage vessel at this time is not accurately reflected being sent. Addressing this, with the present invention, by starting up the fuel cell system upon ending communicative filling, it is possible to prevent an erroneous data signal from being sent.

(6) Similar effects to the above-mentioned (1) are exerted according to the moving body of the present invention.

DETAILED DESCRIPTION OF THE INVENTION

Hereinafter, an embodiment of the present invention will be explained while referencing the drawings.

Figure 1:
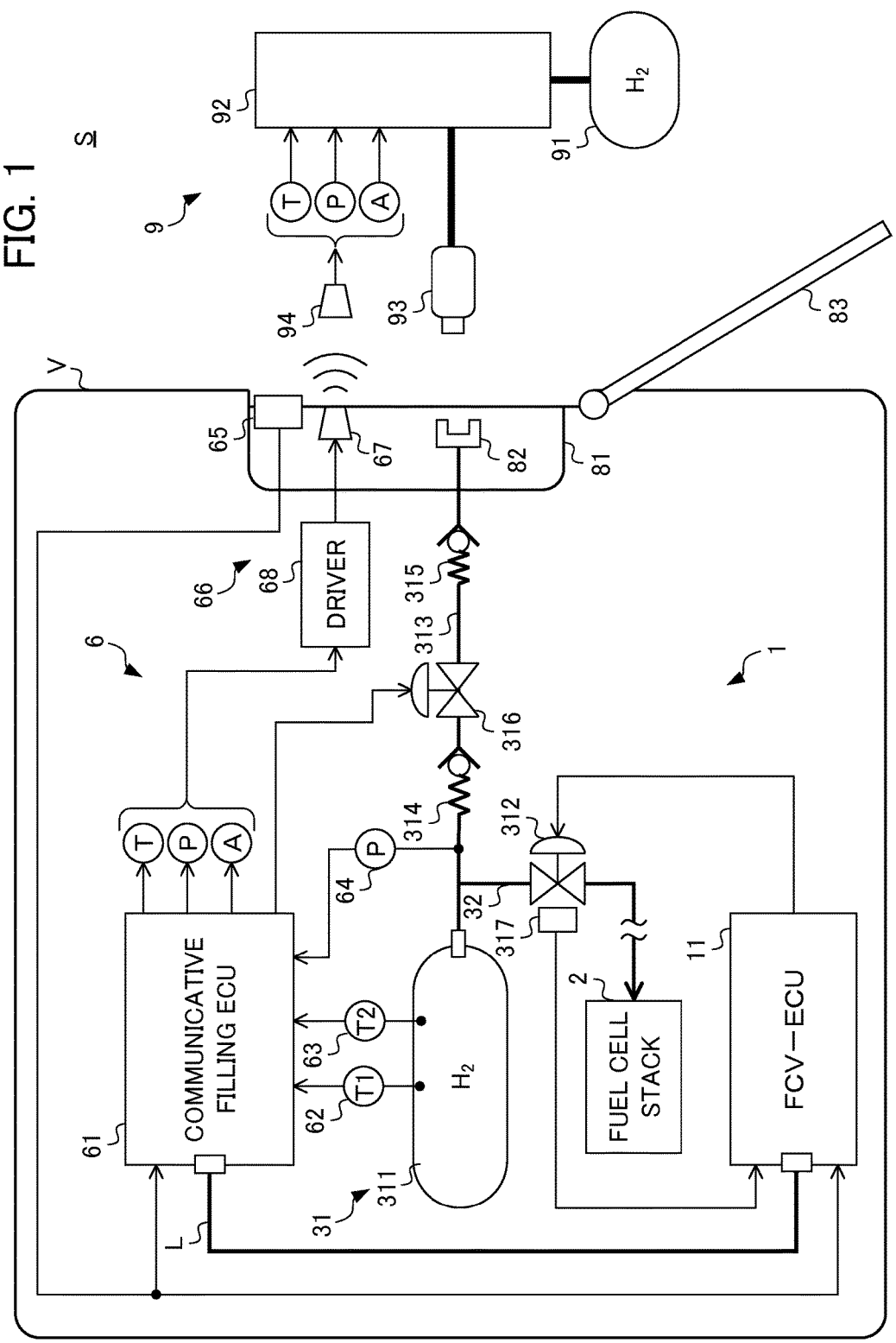
FIG. 1 is view showing the configuration of a hydrogen filling system including a fuel cell vehicle according to an embodiment of the present invention.

FIG. 1 is a view showing the configuration of a hydrogen filling system S. The hydrogen filling system S is configured by combining a fuel cell vehicle V that travels with hydrogen as a fuel gas, and a hydrogen station 9 that supplies hydrogen to a hydrogen tank 31 of this vehicle V.

Configuration of Hydrogen Station 9

The hydrogen station includes a hydrogen storage tank 91 and a dispenser 92. Hydrogen for supplying to the vehicle V is stored at high pressure in the hydrogen storage tank 91. As the hydrogen in this hydrogen storage tank 91, gas arrived at by compressing with a compressor hydrogen produced by vaporizing liquid hydrogen, hydrogen produced by reforming a raw material by way of a reformer, hydrogen produced using an electrolyzer, or the like can be used.

The dispenser 92 reduces the pressure of the hydrogen gas supplied from the hydrogen storage tank 91 when a hydrogen filler nozzle 93 thereof is inserted into a hydrogen feed port 82 provided to the vehicle V, and supplies the hydrogen from the hydrogen filler nozzle 93. The hydrogen supplied from the hydrogen filler nozzle 93 is filled into the hydrogen tank 31 of the vehicle V. In addition, an infrared communication unit 94 is provided to this hydrogen filler nozzle 93. By inserting the hydrogen filler nozzle 93 into the hydrogen feed port 82 of the vehicle V, the infrared communication unit 94 becomes able to send and receive data signals via infrared waves with a communicative filling system 6 described later that is equipped to the vehicle V. Upon filling hydrogen into the vehicle V with the dispenser 92, it is possible to selectively execute the two filling methods of a filling method called communicative filling, and a filling method called non-communicative filling.

Communicative filling is a filling method of filling hydrogen into the vehicle V while performing communication between the vehicle V and the station 9. More specifically, in communicative filling, the dispenser 92 receives a data signal indicating the state of the hydrogen tank 31 from the communicative filling system 6 by way of the infrared communication unit 94, and fills hydrogen into the hydrogen tank 31 in a filling mode (for example, filling flow rate) decided based on this data signal. It should be noted that the specific filling mode decided by communicative filling is mostly determined based on the initial state of the hydrogen tank 31. Therefore, in order to completely fill as quickly as possible by communicative filling, it is necessary to send a data signal accurately reflecting the state of the hydrogen tank 31 particularly when starting communicative filling.

Non-communicative filling is a filling method of filling hydrogen into the vehicle V without performing communication between the vehicle V and the station 9. More specifically, in non-communicative filling, the dispenser 92 fills hydrogen into the hydrogen tank 31 at a defined filling mode (for example, filling flow rate) established in advance. The dispenser 92 during non-communicative filling assumes that the current temperature of the hydrogen tank 31 is a higher temperature than an average temperature at this time; therefore, the filling flow rate is set to a relatively small value. However, in non-communicative filling, the dispenser 92 cannot grasp the current state of the hydrogen tank 31; therefore, even if the temperature inside of the tank rises during filling, the filling flow rate cannot be reduced in response thereto, and the filling will continue at a fixed flow rate. For this reason, in non-communicative filling, the temperature inside of the hydrogen tank 31 during filling may approach a defined maximum temperature and filling may be interrupted prior to reaching actual complete filling. Therefore, if the temperature inside of the hydrogen tank 31 during filling not exceeding the defined maximum temperature is set as a condition, when comparing between communicative filling and non-communicative filling, communicative filling can more suitably control the filling flow rate; therefore, it can more quickly completely refill or fill to the vicinity thereof.

Configuration of Fuel Cell Vehicle V

The fuel cell vehicle V includes a fuel cell system 1 that generates electric power from the hydrogen stored in the hydrogen tank 31 and travels using the electric power thus generated; an electronic control unit (hereinafter referred to as "FCV-ECU") 11 that assumes control of this fuel cell system 1; a communicative filling system 6 that assumes communication with the hydrogen station 9 upon filling hydrogen to the hydrogen tank 31; and an electronic control unit (hereinafter referred to as "communicative filling ECU") 61 that assumes control of this communicative filling system 6. It should be noted that, among the configurations of the entire fuel cell system 1, FIG. 1 mainly shows the configurations of devices required for supplying hydrogen to the hydrogen tank 31.

The FCV-ECU 11 and communicative filling ECU 61 are connected by a communication line L to enable intercommunication. It is thereby possible to send a signal generated by either one among the two ECUs 11 and 61 to the other one, and to synchronize judgment in the two ECUs 11 and 61. Hereinafter, such intercommunication via the communication line L between the FCV-ECU 11 and communicative filling ECU 61 is referred to as "FC-IR intercommunication".

Configuration of Fuel Cell System 1

Figure 2:
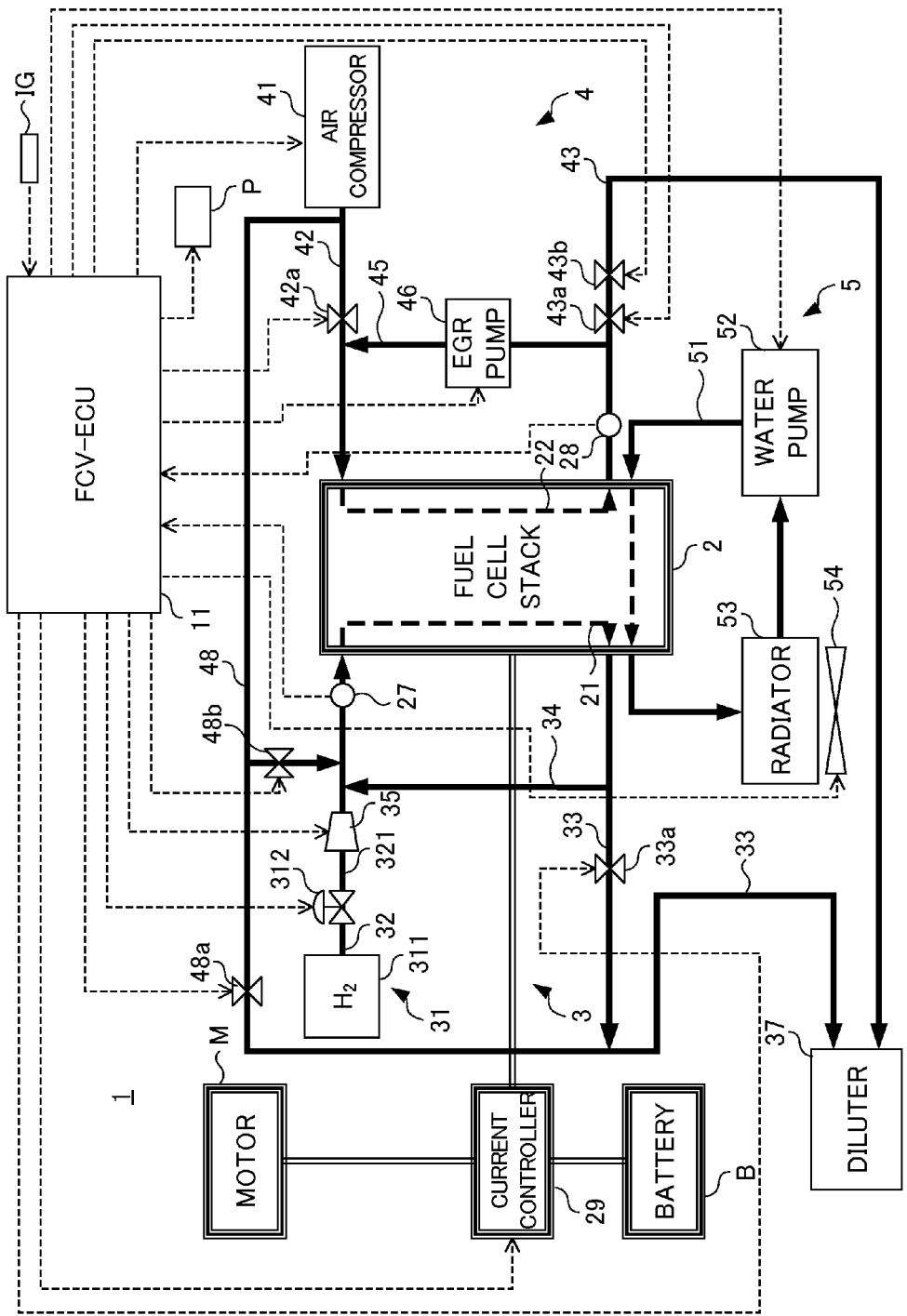
FIG. 2 is a view showing the configuration of a fuel cell system.

FIG. 2 is a view showing the configuration of the fuel cell system 1.

The fuel cell system 1 includes a fuel cell stack 2; an anode system 3 that supplies hydrogen to the fuel cell stack 2; a cathode system 4 that supplies air as an oxidant gas to the fuel cell stack 2; a diluter 37 the performs a post-treatment of gas discharged from the fuel cell stack 2; a cooling device 5 that cools the fuel cell stack 2; a battery B that stores electric power generated by the fuel cell stack 2; a drive motor M that is driven by the supply of electric power from the fuel cell stack 2 and battery B; and the FCV-ECU 11. It should be noted that, among the configurations of the entire fuel cell system 1, FIG. 2 mainly shows the devices necessary in order to allow electric power generation by the fuel cell stack 2.

The fuel cell stack (hereinafter referred to simply as "stack") 2 is a stack structure in which several tens to several hundreds of cells are layered, for example. Each cell of the fuel cell is configured by sandwiching a membrane electrode assembly (MEA) with a pair of separators. The membrane electrode assembly is configured from the two electrodes of an anode and cathode, and a solid polymer electrolyte membrane that is sandwiched between these electrodes. Normally, both electrodes are formed from a catalyst layer that contacts the solid polymer electrode membrane and on which oxidation/reduction reactions occur, and a gas diffusion layer that contacts this catalyst layer. When hydrogen is supplied to the anode flow channel 21 formed on the anode side and air including oxygen is supplied to the cathode flow channel 22 formed on the cathode side, this stack generates electric power by way of an electrochemical reaction of these.

The output current produced from the stack 2 during electric power generation is inputted to the battery B or a load (drive motor M, air compressor 41, etc.) via a current controller 29. The current controller 29 includes a DC-DC converter that is not illustrated, and controls the output current of the stack 2 during electric power generation by way of a chopping operation thereof. Particularly in the EGR discharge processing described later, the current controller sets the output current of the stack 2 as the charge current of the battery B, and charges the battery B while controlling this to a predetermined current command value.

The battery B stores electric power generated by the stack 2 and electrical energy recovered as regenerative braking power by the drive motor M. In addition, during startup of the fuel cell system 1 and during high load operation of the vehicle, for example, the electric power stored in the battery B is supplied to the load so as supplement the output of the stack 2.

The anode system 3 is configured to include the hydrogen tank 31, a hydrogen supply line 32 that reaches an introduction part of the anode flow channel 21 of the stack 2 from the hydrogen tank 31, a hydrogen discharge line 33 that reaches the diluter 37 from a discharge part of the anode flow channel 21, and a hydrogen recirculation line 34 that branches from the hydrogen discharge line 33 to reach the hydrogen supply line 32. A hydrogen circulation flow channel of gas containing hydrogen is configured by the hydrogen supply line 32, anode flow channel 21, hydrogen discharge line 33 and hydrogen recirculation line 34.

Referring back to FIG. 1, the hydrogen tank 31 includes a tank main body 311 that stores hydrogen gas at high pressure, a main stop valve 312 as an on-off valve provided in the hydrogen supply line 32 extending from the tank main body 311, a hydrogen feed line 313 extending from the tank main body 311, and a main stop valve sensor 317 that detects the opened/closed state of the main stop valve. This hydrogen feed line 313 is connected at one end side to the tank main body 311, and the other end side is connected to a hydrogen feed port 82 provided inside of a lid box 81 described later.

Two check valves 314 and 315 and a filling shutoff valve 316 are provided in the hydrogen feed line 313. The filling shutoff valve 316 cuts off the influx of gas to the tank main body 311 and discharge of gas from the tank main body 311. In other words, when opening the filling shutoff valve 316, the supply of hydrogen from the station 9 to the tank main body 311 is accepted, and when closing the filling shutoff valve 316, the supply of hydrogen from the station 9 to the tank main body 311 is rejected. The check valves 314 and 315 are respectively provided in the vicinity of the tank main body 311 and the vicinity of the hydrogen feed port 82, and prevent hydrogen from flowing back from the tank main body 311 side to outside of the vehicle V.

The main stop valve sensor 317 detects the opened/closed state of the main stop valve 312, and transmits a detection signal depending on the state thereof to the FCV-ECU 11. For example, in a case of the main stop valve 312 being the opened state, the main stop valve sensor 317 transmits an opened signal in response thereto to the FCV-ECU 11, and in the case of the main stop valve 312 being the closed state, transmits a closed signal in response to this to the FCV-ECU 11. As this main stop valve sensor 317, for example, a switch for which ON/OFF changes depending on opening/closing of the main stop valve 312, a position sensor that directly detects the position of the valving element of the main stop valve 312, a current sensor that detects the drive current of an electromagnetic actuator that drives the valving element of the main stop valve 312, or the like can be used.

The lid box 81 is provided on a side at the rear of the vehicle V, and protects the hydrogen feed port 82 inside thereof. A lid 83 is rotatably provided to this lid box 81. At the hydrogen station 9, the user opens the lid 83 to cause the hydrogen feed port 82 to be exposed to the outside, and inserts the hydrogen filler nozzle 93 of the dispenser 92 into the hydrogen feed port 82 and fills hydrogen.

Referring back to FIG. 2, an injector 35 that injects new hydrogen gas supplied from the hydrogen tank 31 into the stack 2 is provided in the hydrogen supply line 32, on a downstream side from the main stop valve 312. It should be noted that, hereinafter, the section in the hydrogen supply line 32 between the injector 35 and the main stop valve 312 is referred to as intermediate pressure part 321. The pressure inside of the anode flow channel 21 of the stack 2 during power generation (hereinafter referred to as "anode pressure") is controlled to a predetermined target pressure by driving to open/close the injector 35 in a state in which the pressure inside of the intermediate pressure part 321 is sufficiently high.

In the hydrogen discharge line 33, a purge valve 33a is provided on a downstream side from the connection part with the above-mentioned hydrogen recirculation line 34. When the hydrogen concentration of gas circulating inside of the hydrogen circulation flow channel declines, the power generation efficiency of the stack 2 declines. For this reason, the purge valve 33a is opened at an appropriate timing during electric power generation of the stack 2. The gas inside of the hydrogen circulation flow channel is discharged to the diluter 37.

The cathode system 4 is configured to include the air compressor 41, an air supply line 42 that reaches from the air compressor 41 to an introduction part of the cathode flow channel 22, an air discharge line 43 that reaches from a discharge part of the cathode flow channel 22 to the diluter 37, an air recirculation line 45 that branches from the air discharge line 43 and reaches the air supply line 42, and a stack bypass line 48 that branches from the air discharge line 43 and reaches the hydrogen supply line 32 and the diluter 37. The oxygen circulation flow channel of gas containing oxygen is configured by the air supply line 42, cathode flow channel 22, air discharge line 43 and air recirculation line 45.

The air compressor 41 supplies air from outside the system to the cathode flow channel 22 of the stack 2 via the air supply line 42. In addition, a backpressure valve 43b for adjusting the pressure inside of the cathode flow channel 22 is provided to the air discharge line 43. The pressure inside of the cathode flow channel 22 (hereinafter referred to as "cathode pressure") of the stack 2 during electric power generation is controlled to an appropriate magnitude according to the electric power generation state of the stack 2, by adjusting the aperture of the backpressure valve 43b while supplying air by way of the air compressor 41.

An EGR pump 46 that pressure feeds gas on the air discharge line 43 side to the air supply line 42 to cause gas containing oxygen to circulate inside of the oxygen circulation flow channel is provided to the air recirculation line 45. An inlet sealing valve 42a is provided in the air supply line 42 more to a side of the air compressor 41 than the connection part with the air recirculation line 45. The inlet sealing valve 42a prevents ambient air from flowing in from the air compressor 41 side to the cathode flow channel 22 side during stop of the system 1. In addition, an outlet sealing valve 43a is provided in the air discharge line 43 more on the diluter 37 side than a branching part with the air recirculation line 45. The outlet sealing valve 43a prevents ambient air from flowing in from the diluter 37 side to the cathode flow channel 22 side during stop of the system 1. These sealing valves 42a and 43a are closed in a state filled with inert gas of low oxygen concentration in the cathode flow channel 22 in the EGR stop processing described later (for example, refer to FIG. 4 described later), so as to suppress degradation of the stack 2.

A bypass valve 48a that controls the flow rate of air flowed from the air compressor 41 to the diluter 37, and a scavenging valve 48b that controls the flow rate of air flowed from the air compressor 41 to the hydrogen supply line 32 are provided in the stack bypass line 48. The bypass valve 48a is opened when the backpressure valve 43b is closed and dilution gas cannot be supplied from the air discharge line 43 to the diluter 37, for example, and supplies air immediately after the air compressor 41 to the diluter 37. While stopping electric power generation by the stack 2, the scavenger valve 48b is opened upon executing scavenging processing to discharge impurities remaining inside of the hydrogen circulation flow channel with air supplied from the air compressor 41.

The diluter 37 dilutes gas containing hydrogen discharged via the purge valve 33a with gas introduced via the aforementioned backpressure valve 43b and bypass valve 48a as diluent gas, and discharges out of the system.

The cooling device 5 includes a coolant circulation flow channel 51 that includes the stack 2 in the path, a water pump 52 that pressure feeds coolant inside of the coolant circulation flow channel 51 in a predetermined direction, a radiator 53 that forms a part of the coolant circulation flow channel 51, and a radiator fan 54 that cools the coolant flowing through the radiator 53. The cooling device 5 is configured so not to allow a maximum temperature determined in order to protect the stack 2 to be exceeded, by way of circulating coolant by the water pump 52 to ensure heat exchange between the stack 2 and coolant, as well as cooling the coolant by way of the radiator fan 54.

The anode pressure sensor 27 is provided in the hydrogen supply line 32, detects the anode pressure, and sends a signal substantially proportional to the detected value to the FCV-ECU 11. The cathode pressure sensor 28 is provided in the air discharge line 43, detects the cathode pressure, and sends a signal substantially proportional to the detected value to the FCV-ECU 11.

An information panel P serving as a display device to inform the state of the fuel cell system 1 to the user and an ignition switch IG that is operable by the driver are provided at the driver's seat of the vehicle (not illustrated).

The FCV-ECU 11 is an electronic control unit that controls various devices constituting the fuel cell system 1, and is configured to include a CPU, ROM, RAM and electronic circuits such as various interfaces.

It should be noted that, in the following explanation, electric power supplied from an ECU power source (not illustrated) to the FCV-ECU 11, and in the case of various processing being immediately executable by the ECU 11 as necessary, the ECU 11 is defined as being an operable state. In addition, in a case of electric power from the ECU power source not being supplied to the ECU 11, or this ECU 11 entering a power saving sleep mode state, and thus various processing not being immediately executable by the ECU 11 as necessary, the ECU 11 is defined as being an inoperable state. It should be noted that these definitions of operable state and inoperable state also apply for the communicative filling ECU 61.

The ignition switch IG generates a fuel cell system startup request signal when turned ON from an OFF state. The ECU power source (not illustrated) establishes the FCV-ECU 11 and communicative filling ECU 61 in operable states when detecting the system startup request signal output from the ignition switch IG.

The ignition switch IG generates a fuel cell system stop request signal when turned OFF from the ON state. The FCV-ECU 11 starts system stop processing described later, when detecting the system stop request signal output from the ignition switch IG.

Figure 3:
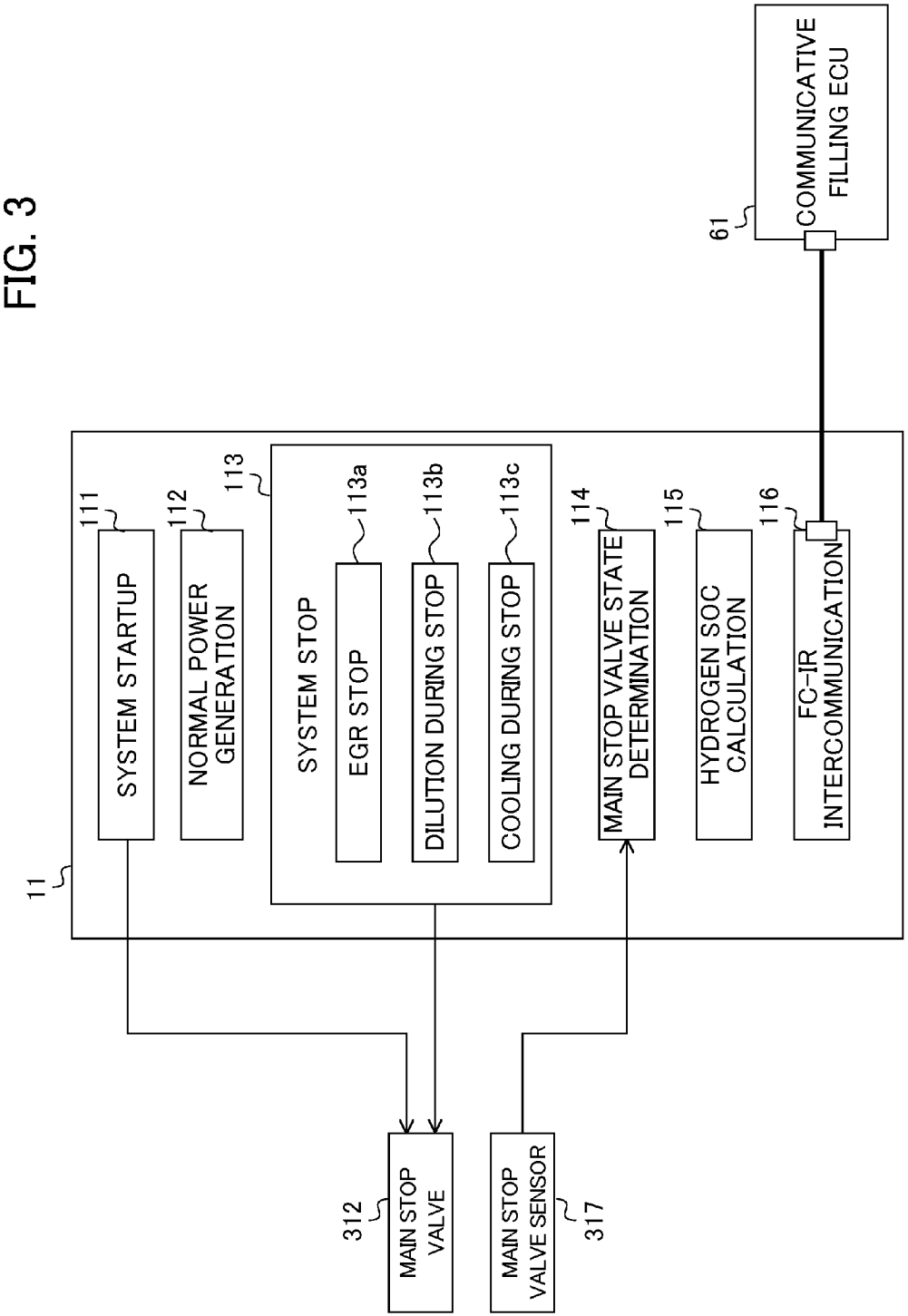
FIG. 3 is a view showing the configuration of an FCV-ECU.

FIG. 3 is a view showing the configuration of the FCV-ECU 11. A plurality of modules 111 to 116 for executing various processing related to electric power generation by the stack, and startup and stop of the fuel cell system (hereinafter processing assumed by the FCV-ECU 11 is generalized and referred to as "fuel cell system processing") are configured in the FCV-ECU 11. Hereinafter, the various modules configured in the FCV-ECU 11 and the functions thereof will be explained.

Among the fuel cell system processing, a system startup unit 111 assumes processing related to startup of the fuel cell system, i.e. processing to stably establish the stack into a state capable of electric power generation (hereinafter referred to as "system startup processing").

In system startup processing, first, the main stop valve 312 is opened along with the air compressor being driven, whereby the supply of hydrogen and air to the stack is begun. In addition, in this system startup processing, impurities remaining inside of the hydrogen circulation flow channel are discharged to outside of the system by supplying the hydrogen inside of the hydrogen tank while opening the purge valve, and in place thereof, the inside of the hydrogen circulation flow channel is filled with new hydrogen supplied from the hydrogen tank. Then, in response to the open voltage of the stack having risen up to a predetermined value by the inside of the hydrogen circulation flow channel being replaced with new hydrogen, it is determined that startup of the fuel cell system has completed, and a contactor that is not illustrated is closed to connect the stack and a load. The system startup processing thereby completes. It should be noted that, in the system startup processing, the electric power stored in the battery is used. It should be noted that this system startup processing is executed by the system startup unit 111 in response to the execution of system startup processing being allowed (in response to the control mode described later transitioning to mode 1 or mode 3), after the FCV-ECU 11 has entered the operable state in response to having detected a system startup request signal from the ignition switch.

Among the fuel cell system processing, a normal power generation unit 112 assumes processing to perform electric power generation in response to a request of the driver (hereinafter referred to as "normal electric power generation"). With normal electric power generation, a request for output current of the stack is acquired based on the input from an accelerator pedal (not illustrated), and the cathode pressure and anode pressure are controlled so that this request is realized. This normal electric power generation is executed by the normal electric power generation unit 112 after the above-mentioned system startup processing has completed and until a system stop request (IG-OFF) is detected.

Figure 4:
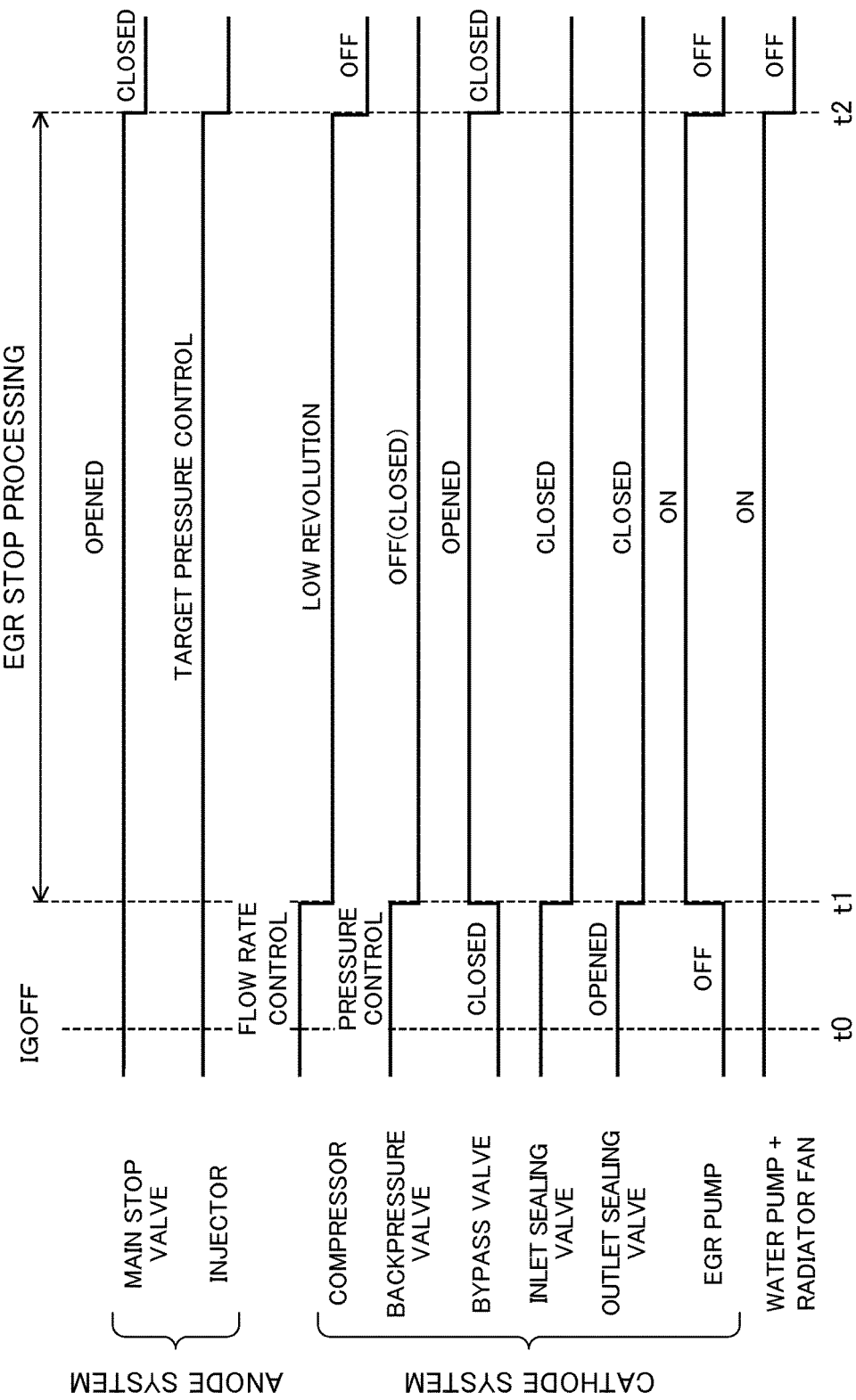
FIG. 4 is a flowchart showing the control sequence of each device in system stop processing.

A system stop unit 113 assumes processing related to stop of the fuel cell system (hereinafter referred to as "system stop processing"). The system stop processing is configured by the three types of processing of EGR stop processing, dilution-during stop processing and cooling-during stop processing. FIG. 4 is a flowchart showing a control sequence of each device in the system stop processing.

Among the three types of system stop processing, an EGR stop section 113a assumes the EGR stop processing. This EGR stop processing is processing that consumes oxygen remaining in the cathode flow channel of the stack before allowing the system to completely stop, in order to suppress degradation of the stack while stopping electric power generation. In regards to the devices of the anode system, the EGR stop processing controls the anode pressure to a target pressure set in advance (hereinafter referred to as "target pressure during discharge") by way of the injector in a state opening the main stop valve. On the other hand, in regards to devices of the cathode system, the cathode pressure is maintained at a predetermined target pressure by driving the compressor in a state closing the inlet sealing valve and outlet sealing valve. In addition, by driving the EGR pump, gas is made to circulate inside of the oxygen circulation flow channel, and the oxygen concentration inside of the oxygen circulation flow channel is made to gradually decline. In the EGR stop processing, electric power generation by the stack and discharge are performed over a predetermined time while maintaining the hydrogen circulation flow channel and oxygen circulation flow channel in the aforementioned such states, thereby causing the oxygen concentration inside of the oxygen circulation flow channel to decline. The EGR stop processing closes the main stop valve, after the oxygen concentration inside of the oxygen circulation flow channel has declined to a predetermined concentration, or after a time has elapsed of an extent enabling to determine that the oxygen concentration has declined to a predetermined concentration, and then ends. It should be noted that electric power generation current produced from the stack while executing this EGR discharge processing is supplied to the battery, for example.

Since inert gas with low oxygen concentration is filled into the cathode flow channel of the stack by executing EGR stop processing in the aforementioned such sequence, degradation of the stack can be suppressed.

Among the three types of system stop processing, a dilution during stop section 113b assumes dilution-during stop processing. This dilution-during stop processing is processing for diluting hydrogen gas remaining inside of the diluter to cause the hydrogen concentration inside the diluter to decline to a predetermined concentration over a predetermined time, during a stop command for the system. This dilution-during stop processing does not require actively supplying hydrogen gas to the stack, and can be executed in parallel with the above-mentioned EGR stop processing due to being processing that can be executed so long as a state driving the compressor and able to introduce dilution gas into the diluter. Therefore, in the present embodiment, dilution-during stop processing is started immediately after having detected a system stop request signal.

More specifically, in the dilution-during stop processing, as shown in FIG. 4, by appropriately opening and closing the backpressure valve, stack bypass valve, etc. in a state driving the compressor, the gas discharged from the stack and gas immediately after the compressor is introduced to the diluter, and hydrogen inside of the diluter is diluted with this as dilution gas. It should be noted that, while closing the outlet sealing valve, it is not possible to introduce dilution gas to the diluter, even if opening the backpressure valve. For this reason, while performing EGR discharge processing, dilution gas is introduced to the diluter by appropriately opening and closing the stack bypass valve.

Among the three types of system stop processing, a cooling-during stop section 113c assumes cooling-during stop processing. This cooling-during stop processing is processing that causes the temperature of the stack to decline over a predetermined time down to normal temperature, for example, by appropriately driving the water pump and radiator fan (refer to FIG. 4). This cooling processing does not require actively supplying hydrogen gas to the stack, and can be executed in parallel to the above-mentioned EGR stop processing and dilution processing due to being processing executed by driving devices that are unrelated to the state of electric power generation by the stack and the diluter such as the water pump and radiator fan. Therefore, in the present embodiment, cooling-during stop processing is started immediately after having detected a system stop request signal.

It should be noted that, among the three types of system stop processing explained in the foregoing, the EGR stop processing is processing that cannot be performed without opening the main stop valve, and the dilution-during stop processing and cooling-during stop processing are types of processing that can be performed even without opening the main stop valve.

In addition, the three types of system stop processing explained in the foregoing are executed upon the event of having detected the system stop request signal as mentioned above. Then, after all of the above-mentioned three types of system stop processing have ended, the FCV-ECU enters an inoperable state.

Referring back to FIG. 3, a hydrogen SOC calculation unit 115 assumes calculation of a current hydrogen SOC of the hydrogen tank. It should be noted that the hydrogen SOC of the hydrogen tank is a value by which the current amount of hydrogen remaining in the hydrogen tank is represented by a percentage with the amount of hydrogen that can be stored in the hydrogen tank as 1. The hydrogen SOC calculation unit 115 calculates the hydrogen SOC based on a data signal related to the pressure and temperature inside of the hydrogen tank sent via the FC-IR intercommunication unit 116 described later. The hydrogen SOC calculated by the hydrogen SOC calculation unit 115 is used as appropriate in the aforementioned system startup processing, normal electric power generation and system stop processing.

The main stop valve state determination unit 114 determines the opened/closed state of the main stop valve 312, based on the open/close command signal for the main stop valve 312 and the detection signal from the main stop valve sensor 317. The state of the main stop valve is divided into the four states of completely closed state, completely opened state, incompletely closed state and incompletely opened state. The completely closed state is a state in which the main stop valve is currently completely closed, and there are no plans to be opened in the near future. The completely opened state is a state in which the main stop valve is currently completely opened, and there are no plans to be closed in the near future. The incompletely closed state is a state in which it is assumed that the main stop valve will be closed in the near future. The incompletely opened state is a state in which it is assumed that the main stop valve will be opened in the near future.

The main stop valve state determination unit 114 determines that the state of the main stop valve is the completely closed state in a case of a closed signal being output from the main stop valve sensor 317 after a close command for the main stop valve 312 being outputted from any of the system startup unit 111, normal electric power generation unit 112 and system stop unit 113.

The main stop valve state determination unit 114 determines that the state of the main stop valve is the completely opened state in a case of an opened signal being outputted from the main stop valve sensor 317 after an open command for the main stop valve 312 being outputted from any of the system startup unit 111, normal electric power generation unit 112 and system stop unit 113.

The main stop valve state determination unit 114 determines that the state of the main stop valve is the incompletely closed state in a case of an opened signal being outputted from the main stop valve sensor 317 after a close command for the main stop valve 312 being outputted from any of the system startup unit 111, normal electric power generation unit 112 and system stop unit 113.

The main stop valve state determination unit 114 determines that the state of the main stop valve is the incompletely opened state in a case of a closed signal being output from the main stop valve sensor 317 after an open command for the main stop valve 312 being outputted from any of the system startup unit 111, normal electric power generation unit 112 and system stop unit 113.

The FC-IR intercommunication unit 116 assumes processing on the FCV-ECU 11 side of FC-IR intercommunication via the communication line L. A data signal related to information required in processing on the communicative filling ECU 61 side, for example, the opened/closed state of the main stop valve 312 and the operable state of the FCV-ECU 11, is sent from the FCV-ECU 11 side to the communicative filling ECU 61 side. In addition, a data signal related to information required in processing on the FCV-ECU 11 side, for example, the temperature and pressure inside of the hydrogen tank required in calculation of the hydrogen SOC, is sent from the communicative filling ECU 61 side to the FCV-ECU 11 side.

Configuration of Communicative Filling System 6

Referring back to FIG. 1, the configuration of the communicative filling system 6 of the fuel cell vehicle V will be explained.

The communicative filling system 6 includes: two tank temperature sensors 62, 63 and a tank pressure sensor 64 to detect the state of the hydrogen tank 31; a lid sensor 65 that detects the state of the lid 83; an infrared transmitter 66; and the communicative filling ECU 61.

The first tank temperature sensor 62 detects the hydrogen temperature inside of the tank main body 311 of the hydrogen tank 31, and sends a signal substantially proportional to the detection value to the communicative filling ECU 61. The second tank temperature sensor 63 detects the hydrogen temperature inside of the tank main body 311 of the hydrogen tank 31, and sends a signal substantially proportional to the detection value to the communicative filling ECU 61. The tank pressure sensor 64 detects the pressure in the hydrogen feed line 313 on the tank main body 311 side from the check valve 314, and sends a signal substantially proportional to the detection value to the communicative filling ECU 61. It should be noted that these detection signals of the sensors 62 to 64 for detecting the state of the hydrogen tank 31 are input only to the communicative filling ECU 61, and are not input to the FCV-ECU 11. Therefore, the detection signals of these sensors 62 to 64 and the data signal generated based on these detection signals are sent to the FCV-ECU 11 by FC-IR intercommunication.

The lid sensor 65 is provided to the lid box 81, and detects the opened/closed state of the lid 83. In a state in which the lid 83 is closed, and the hydrogen feed port 82 is protected inside of the lid box 81, the lid sensor 65 sends a closed signal indicating this to the communicative filling ECU 61. In a state in which the lid 83 is opened and the hydrogen feed port 82 is exposed externally, the lid sensor 65 sends an opened signal indicating this to the communicative filling ECU 61 and FCV-ECU 11.

In order to fill hydrogen in the above way, the lid 83 must be opened. Therefore, the opening/closing of the lid 83 is a preparatory action for a user to start or end filling of hydrogen. Therefore, an opened signal outputted from the lid sensor 65 is hereinafter referred to also as a startup request signal for the communication filling system 6. In addition, a closed signal outputted from the lid sensor 65 is also referred to as a stop request signal for the communicative filling system 6.

The infrared transmitter 66 is configured by an infrared LED 67 and a driver 68 thereof. The driver 68 causes the infrared LED 67 to illuminate in a situation responding to a data signal sent from the communicative filling ECU 61. Hereinafter, infrared communication between the station 9 and communicative filling system 6 using this infrared transmitter is referred to as "IR communication", and is handled distinctly from FC-IR intercommunication.

The communicative filling ECU 61 is an electronic control unit that controls various devices constituting the communicative filling system 6, and is configured to include a CPU, ROM, RAM and electronic circuits such as various interfaces.

Figure 5:
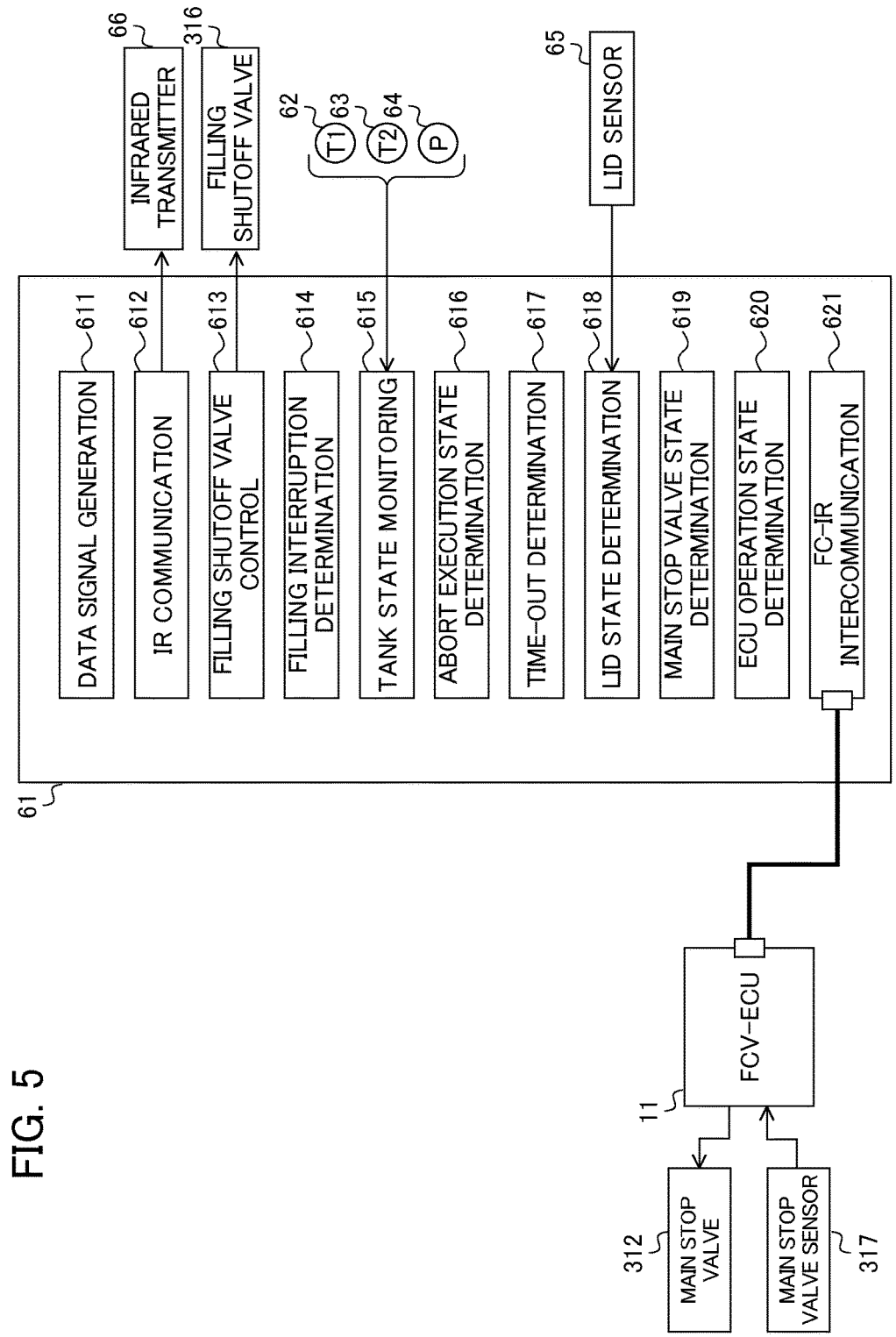
FIG. 5 is a view showing the configuration of a communicative filling ECU.

FIG. 5 is a view showing the configuration of the communicative filling ECU 61. A plurality of modules 611 to 621 for executing processing related to communication with the hydrogen station by the communicative filling system 6 and filling of hydrogen from the hydrogen station (hereinafter processing assumed by the communicative filling ECU 61 is generalized and referred to as "communicative filling system processing") are configured in the communicative filling ECU 61. Hereinafter, various modules configured in the communicative filling ECU 61 and the functions thereof will be explained.

The ECU power source (not illustrated) establishes the communicative filling ECU 61 in an operable state, and establishes various processing explained hereinafter in an executable state, when the lid is opened and a communicative filling system startup request signal from the lid sensor 65 is detected. It should be noted that the communicative filling ECU 61 enters an operable state also in the case of having detected a fuel cell system startup request signal from the ignition switch as mentioned above; however, in this case, different from the case of opening the lid and establishing the communicative filling ECU 61 in an operable state, several functions of the communicative filling ECU 61 are limited. It should be noted that the differences between a case of a user starting up from the ignition switch and a case of starting up from the lid will be explained in detail while referencing FIG. 9 later.

A data signal generation unit 611 generates a data signal sent by IR communication, i.e. a data signal required in order to perform communicative filling. The data signal generation unit 611 generates a data signal based on the temperature and pressure of the hydrogen tank calculated by a tank state monitoring unit 615 described later. In addition, in the case of a filling interruption request occurring while performing communicative filling, the data signal generation unit 611 generates a data signal indicating a state in which interruption of filling has been requested (hereinafter referred to as "abort signal") to inform this to the station side.

In response to a predetermined communicative filling start condition having been satisfied, an IR communication unit 612 converts a data signal related to the temperature (T) and pressure (P) of the hydrogen tank generated by the data signal generation unit 611 and an abort signal (A) into appropriate infrared signals and sends to the station side by the infrared transmitter 66 (IR communication). As explained earlier, the hydrogen station supplies hydrogen to the vehicle in an appropriate mode, based on data signals related to the temperature and pressure received. In addition, the hydrogen station starts processing for interrupting the filling determined in advance, in a case of having received an abort signal during communicative filling.

Herein, communicative filling start conditions for the IR communication unit 612 to start IR communication, for example, is the matter of detecting a predetermined filling start request from the user (for example, the hydrogen filler nozzle of the station being inserted into the hydrogen filler port of the vehicle), in a state in which the communicative filling system can execute communicative filling; however, it is not limited thereto.

The filling shutoff valve control unit 613 opens the filling shutoff valve 316 in response to detecting the aforementioned filling start request, thereby establishing a state in which it is possible to fill hydrogen into the hydrogen tank. Hydrogen is thereby supplied at a flow rate determined on the station side, and filled into the hydrogen tank. Subsequently, the filling shutoff valve control unit 613 closes the filling shutoff valve 316 in response to a predetermined communicative filling end condition or non-communicative filling end condition having been satisfied. The supply of hydrogen from the station side thereby ends. It should be noted that the filling shutoff valve control unit 613 closes the filling shutoff valve to forcibly end filling of hydrogen, even if the above-mentioned filling end condition is not satisfied, in the case of a filling interruption request described later having occurred.

A filling interruption determination unit 614 determines the necessity to interrupt filling of hydrogen during execution. More specifically, the filling interruption determination unit 614 compares the temperature, pressure and hydrogen SOC calculated in the tank state monitoring unit 615 while performing communicative filling or non-communicative filling, with an upper limit value set in advance for each. The filling interruption judgment unit 614 requests interruption of filling of hydrogen during current execution to the data signal generation unit 611, IR communication unit 612 and filling shutoff valve control unit 613, in a case of any of the above-mentioned temperature, pressure and hydrogen SOC having exceeded the above-mentioned upper limit values. The IR communication unit 612 thereby sends an abort signal to the station side, and the filling shutoff valve control unit 613 closes the filling shutoff valve 316, in the case of being during execution of communicative filling. Hereinafter, the sequence of processing performed after the filling interruption request has occurred is referred to as abort processing.

The tank state monitoring unit 615 calculates the temperature, pressure and hydrogen SOC inside the hydrogen tank based on the outputs of the sensors 62, 63 and 64 detecting the state of the hydrogen tank. More specifically, the tank state monitoring unit 615 calculates the pressure inside of the hydrogen tank based on the output of the tank pressure sensor 64. In addition, the tank state monitoring unit 615 calculates the temperature inside of the hydrogen tank based on the outputs of the two tank temperature sensors 62 and 63. As explained by referencing FIG. 1, the two tank temperature sensors 62 and 63 detect temperatures at about the same positions in the tank main body 311. Therefore, the output of the second tank temperature sensor 63 is used as a check signal for supporting that the first tank temperature sensor 62 is normal. In addition, the tank state monitoring unit 615 calculates the hydrogen SOC based on the temperature and pressure calculated.

An abort implementation state determination unit 616 assumes processing related to determination of the implementation state of the aforementioned abort processing. Herein, the abort implementation state is divided into the three states of an abort incomplete state, abort complete state, and non-abort state.

The non-abort state corresponds to a state after communicative filling or non-communicative filling has ended without abort processing being executed due to a filling interruption request not occurring.

The abort incomplete state corresponds to a state in the middle of abort processing being performed in response to a filling interruption request having occurred. In addition, a state in the middle of communicative filling or non-communicative filling in which there is a possibility of a filling interruption request occurring from there on is also defined as the abort incomplete state.

The abort complete state corresponds to a state after the abort processing is executed and this processing has completed, after a filling interruption request has occurred.

The abort implementation state determination unit 616 determines that the abort processing implementation state is the abort incomplete state in a period from communicative filling or non-communicative filling starting until this filling ends normally, and after filling ends normally, determines the abort processing implementation state is the non-abort state. In addition, in a case of communicative filling or non-communicative filling starting and then a filling interruption request occurring, and subsequently, in the period until the abort processing completes, the abort implementation state determination unit 616 determines that the abort processing implementation state is the abort incomplete state, and after the abort processing completes, determines that the abort processing implementation state is the abort complete state.

The timeout determination unit 617 measures a time elapsed since entering a state in which it is possible to perform communicative filling by the communicative filling system (hereinafter referred to as "communication operation time"), and determines whether this communication operation time exceeds a predetermined time limit. Herein, "state in which it is possible to perform communicative filling" refers to a state in which the control mode described later is either of a mode 2 or 3, and more strictly, refers to a state in which the communicative filling ECU 61 is in an operable state and the execution of processing in the data signal generation unit 611 and IR communication unit 612 is permitted. It should be noted that, in the case of the control mode switching between mode 2 and mode 3, it is preferable for the above-mentioned communication operation time to be continually added without clearing in every occurrence.

As mentioned above, when detecting a communicative filling system startup request signal from the lid sensor 65, the communicative filling ECU 61 enters the operable state. For this reason, when opening the lid 83 and left in the communication standby state, there is concern over consuming more electric power, which is being supplied to the communicative filling ECU 61, infrared transmitter 66, etc., than is necessary. Therefore, the communicative filling ECU 61 enters the inoperable state, with having determined that the communication operation time exceeded the time limit by way of the timeout determination unit 617 as one condition.

The lid state determination unit 618 determines the state of the lid 83 based on the detection signal from the lid sensor 65. The state of the lid 83 is divided into the two states of a closed state and an open state.

The lid state determination unit 618 determines that the state of the lid 83 is the open state while receiving an open signal from the lid sensor 65.

The lid state determination unit 618 determines that the state of the lid 83 is the closed state while receiving a closed signal from the lid sensor 65. However, as shown in FIG. 1, since the lid sensor 65 is also exposed to the outside when opening the lid 83, it is possible to directly contact the lid sensor 65 while the lid 83 is opened. For this reason, once the lid 83 is opened, a closed signal may be instantaneously outputted from the lid sensor 65 despite the lid being opened. In order to prevent such a misjudgment, the lid state determination unit 618 does not determine as the closed state immediately in the case of the output of the lid sensor 65 switching from an opened signal to closed signal, and determines as the closed state in a case of continually receiving a closed signal for a predetermined time after switching from the opened signal to closed signal.

The main stop valve state determination unit 619 determines the state of the main stop valve 312 based on a data signal indicating the opened/closed state of the main stop valve sent from the FCV-ECU 11. Similarly to the determination on the FCV-ECU 11 side, the state of the main stop valve 312 is divided into the four states of a completely closed state, completely opened state, incompletely closed state and incompletely opened state. Determination of the opened/closed state of the main stop valve 312 in the main stop valve state determination unit 619 of the communicative filling ECU 61 is synchronized with the determination of the opened/closed state of the main stop valve 312 in the FCV-ECU 11.

As mentioned above, the EGR stop processing performed while the FCV-ECU 11 is an operable state ultimately closes the main stop valve 312. Therefore, the state of the main stop valve 312 is the completely closed state while the FCV-ECU 11 is an inoperable state. Therefore, while the FCV-ECU 11 is an inoperable state and communication between the FCV-ECU 11 and communicative filling ECU 61 is severed, the main stop valve state determination unit 619 of the communicative filling ECU 61 determines that the state of the main stop valve 312 is the completely closed state. The state of the main stop valve 312 can thereby be determined in the communicative filling ECU 61 to which the main stop valve sensor 317 is not directly connected.

The ECU operation state determination unit 620 determines if the FCV-ECU is an operable state or is an inoperable state. More specifically, the FCV-ECU operation state determination unit 620 determines that the FCV-ECU 11 is an operable state while receiving some data signals from the FCV-ECU 11 via the FC-IR intercommunication unit 621, for example. Then, the FCV-ECU operation state determination unit 620 determines that the FCV-ECU 11 is an inoperable state in a case of communication from the FCV-ECU 11 having suspended.

The FC-IR intercommunication unit 621 assumes processing on the communicative filling ECU 61 side of FC-IR intercommunication via the communication line L. As mentioned above, data signals related to the opened/closed state of the main stop valve 312 or operable state of the FCV-ECU 11 are sent from the FCV-ECU 11 side to the communicative filling ECU 61 side. In addition, data signals related to the temperature and pressure calculated by the tank state monitoring unit 615 are sent from the communicative filling ECU 61 side to the FCV-ECU 11 side.

As explained in the foregoing, various devices constituting the fuel cell vehicle V are controlled by the two electronic control units 11 and 61. Hereinafter, these two electronic control units 11 and 61 and the operation states of each module configured therein are defined as control modes. Hereinafter, the modules operating in each control mode and transition conditions between control modes will be explained.

The below table is a table summarizing the roles of three control modes and the types of communication executed. In mode 1, processing related to startup, electric power generation and stop of the fuel cell system, as well as travel of the fuel cell vehicle is executed.

In mode 1, FC-IR intercommunication is performed, and IR communication is not performed.

In mode 2, processing related to filling of hydrogen at a hydrogen station is executed. In mode 2, IR communication is performed, and FC-IR intercommunication is not performed.

In mode 3, processing related to filling of hydrogen at the hydrogen station, i.e. processing executed in mode 2 and part of the processing executed in mode 1, is executed. In other words, mode 3 refers to a control mode combining mode 1 and mode 2. In mode 3, both FC-IR intercommunication and IR communication are performed.

TABLE 1

| Control mode | Role | Communication function |
|---|---|---|
| Mode 1 | Startup, power generation and stop of fuel cell system, as well as travel of fuel cell vehicle | FC-IR intercommunication |
| Mode 2 | Filling hydrogen to hydrogen tank | IR communication |
| Mode 3 | Parallel execution of mode 2 and part of mode 1 | FC-IR intercommunication and IR communication |

Figure 6:
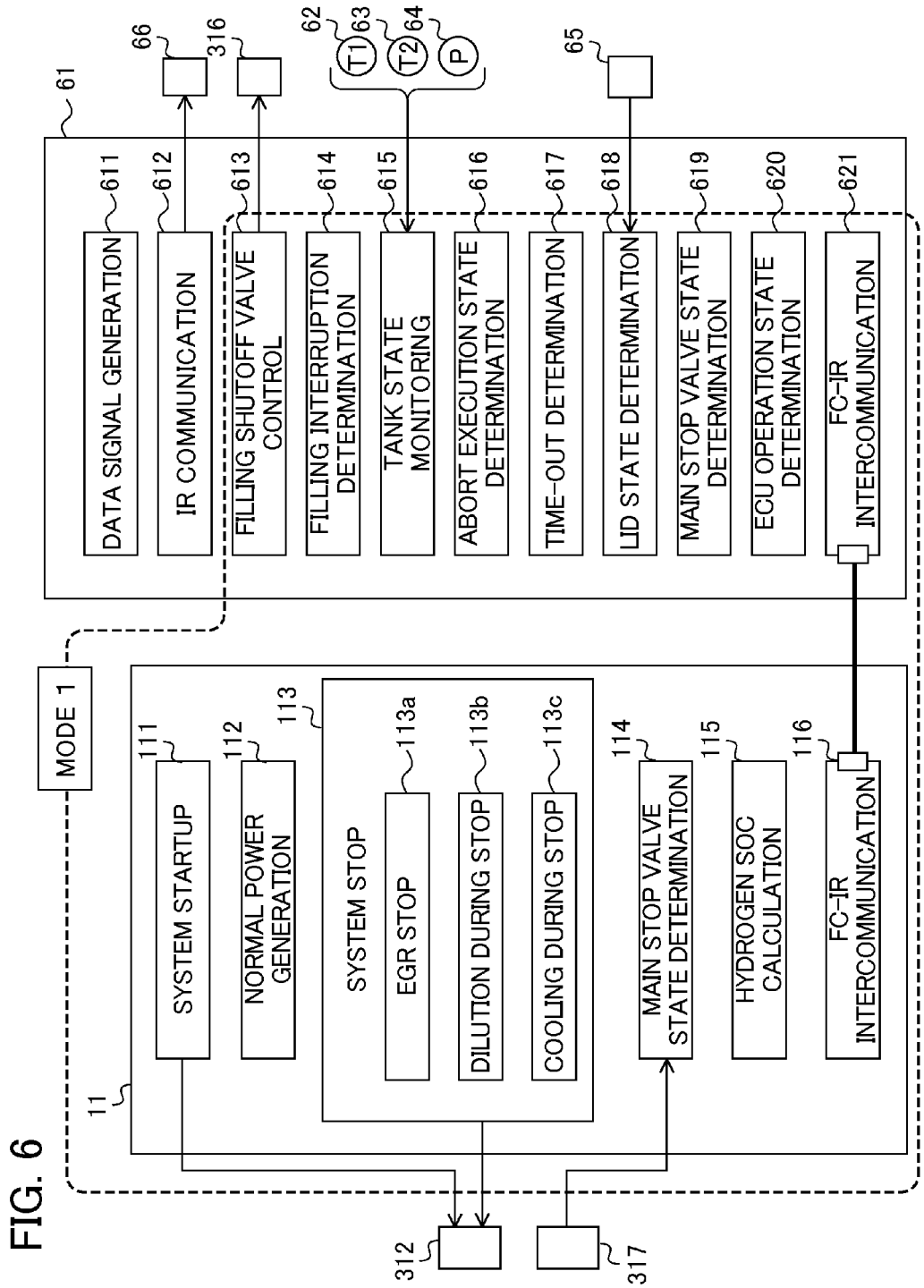
FIG. 6 is a view showing modules operating in a mode 1 among two ECUs.

FIG. 6 is a diagram showing modules operating in mode 1, i.e. processing for which executed is permitted, in the two ECUs 11 and 61. In FIG. 6, the modules surrounded by the dotted line correspond to processing permitted in mode 1. In other words, modules not surrounded by a dotted line in FIG. 6 correspond to processing that is inhibited in mode 1.

As shown in FIG. 6, the FCV-ECU 11 permits execution of all processing in mode 1. In addition, the communicative filling ECU 61 inhibits data signal generation by the data signal generation unit 611 and IR communication by the IR communication unit 612, and the execution of other processing is permitted. In other words, in mode 1, it is not possible to perform communicative filling due to IR communication being inhibited. However, in mode 1, since control of the filling shutoff valve by the filling shutoff valve control unit 613 is permitted, it is possible to perform non-communicative filling.

Figure 7:
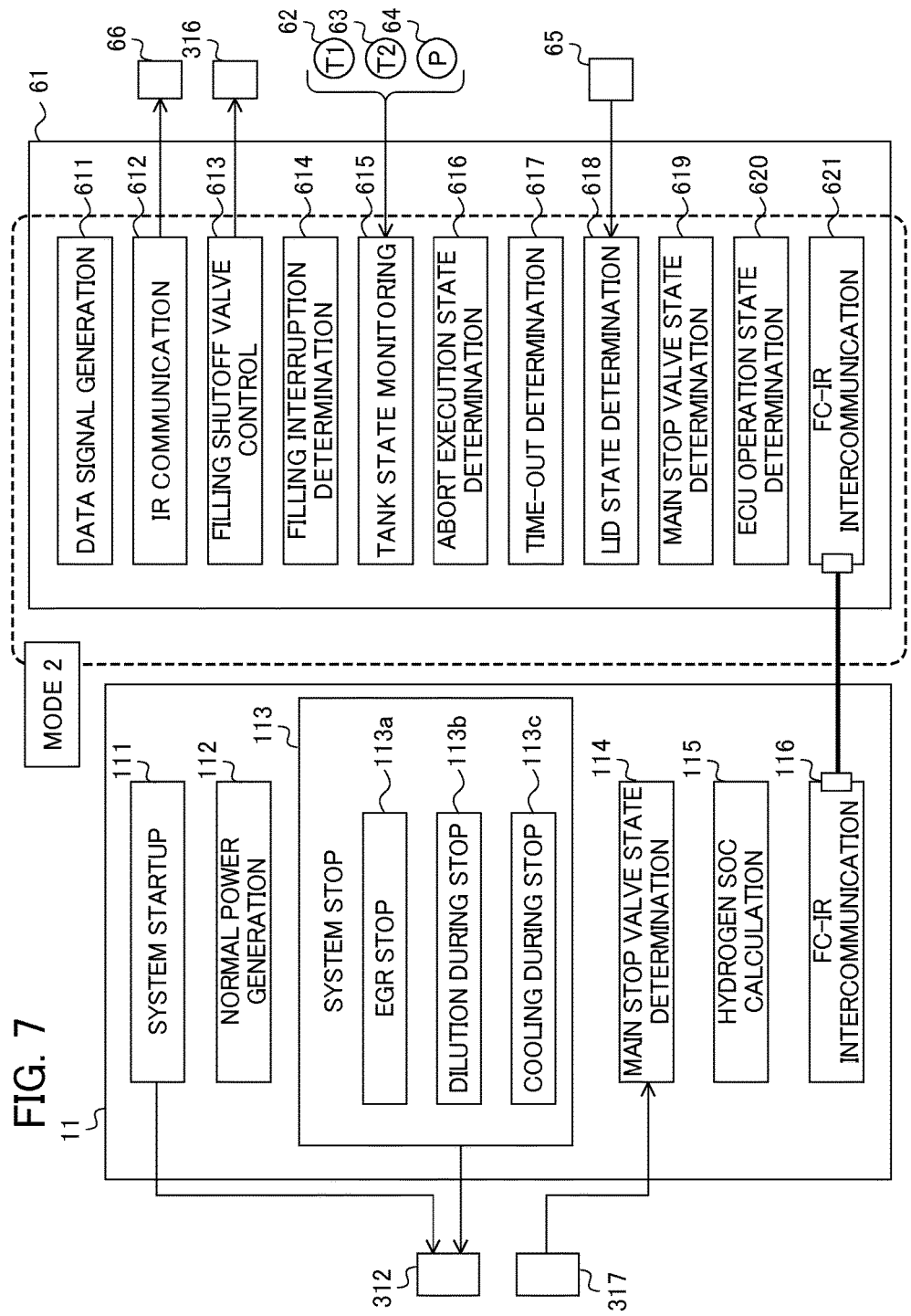
FIG. 7 is a view showing modules operating in a mode 2 among two ECUs.

FIG. 7 is a diagram showing modules operating in mode 2, among the two ECUs 11 and 61.

As shown in FIG. 7, the communicative filling ECU 61 permits the execution of all processing in mode 2. Therefore, in mode 2, IR communication is performed, and consequently it is possible to perform communicative filling. In addition, the FCV-ECU 11 inhibits execution of all processing. In other words, in mode 2, the FCV-ECU 11 enters an inoperable state. Therefore, in mode 2, it is not possible to perform FC-IR intercommunication.

Figure 8:
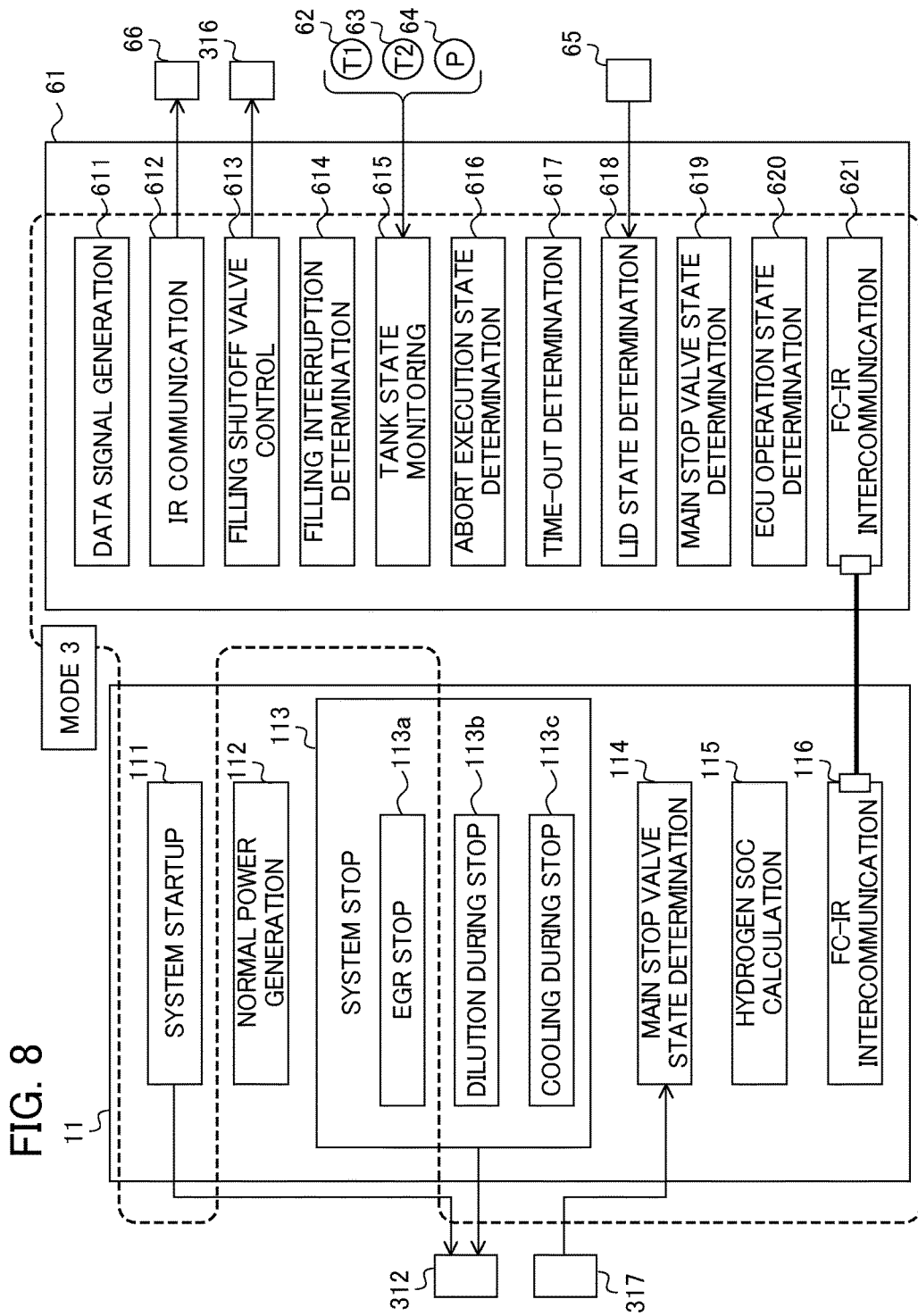
FIG. 8 is a view showing modules operating in a mode 3 among two ECUs.

FIG. 8 is a view showing modules operating in mode 3, among the two ECUs 11 and 61.

As shown in FIG. 8, the communicative filling ECU 61 permits the execution of all processing in mode 3, similarly to mode 2. Therefore, in mode 3, IR communication is performed, and consequently it is possible to perform communicative filling. In addition, the FCV-ECU 11 inhibits normal electric power generation and the execution of part of the processing of system stop processing, and permits the execution of other processing. Particularly herein, among the three types of system stop processing in mode 3 in which IR communication is permitted, the FCV-ECU 11 inhibits the execution of EGR stop processing performed while opening the main stop valve, and permits the execution of the cooling-during stop processing and dilution-during stop processing performed while closing the main stop valve. In the middle of performing the cooling-during stop processing or dilution-during stop processing in which the main stop valve is not opened, communicative filling is started, and it is possible to execute these concurrently.

In addition, in mode 3, the FCV-ECU 11 permits the execution of system startup processing. It is thereby possible to start system startup processing in a case of a system startup request signal arising in the middle of performing communicative filling. However, in this case, in order to prevent system startup processing and communicative filling accompanying the valve opening of the main stop valve being executed concurrently, the start of system startup processing is prioritized, and communicative filling during execution ends. In other words, in a case of a system startup request signal arising while performing communicative filling, the communicative filling ECU 61 ends communicative filling during execution, and the FCV-ECU 11 starts system startup processing.

Next, the transition conditions of these three control modes will be explained while referencing FIGS. 9 and 10.

Figure 9:
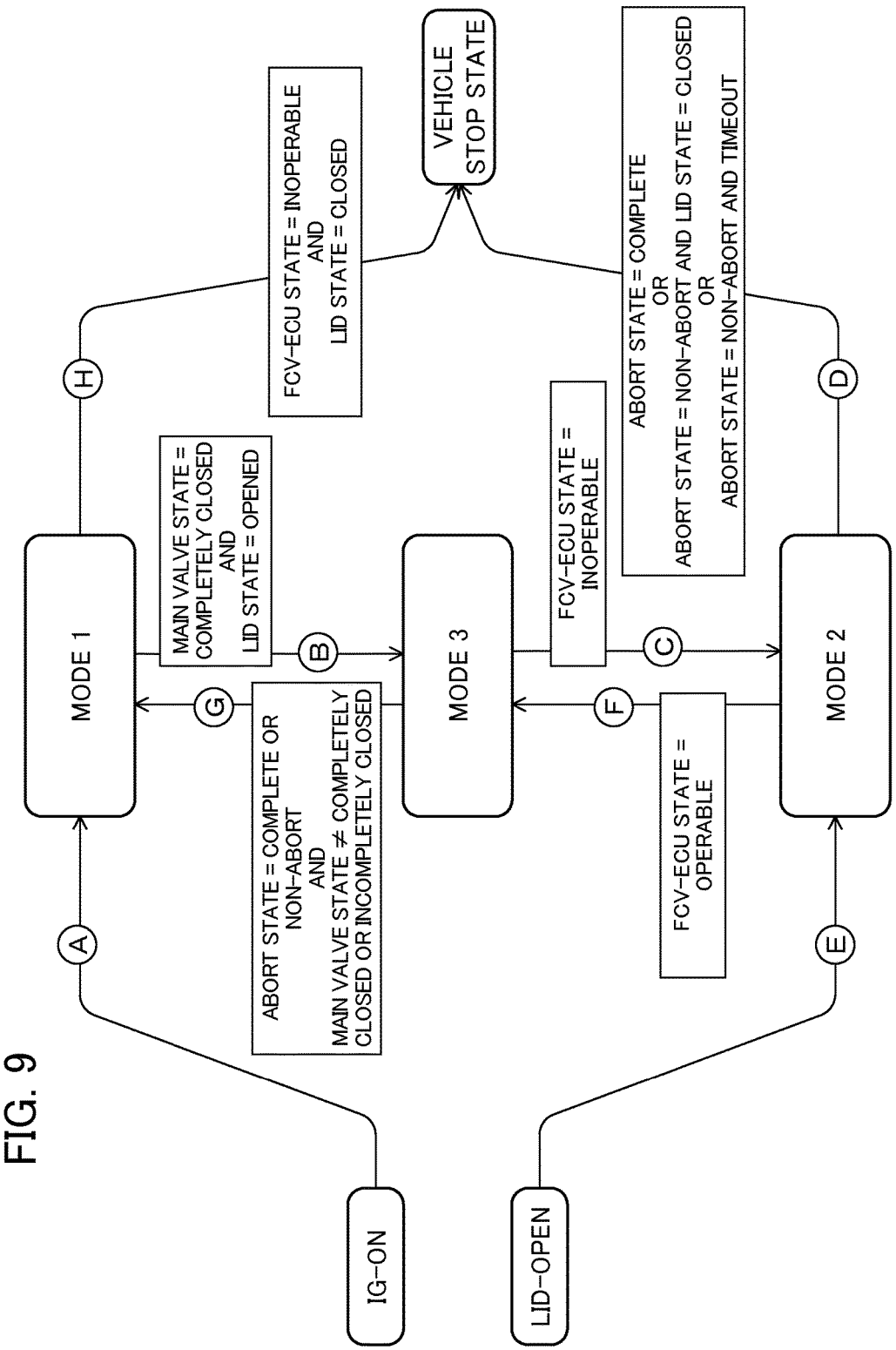
FIG. 9 is a view schematically showing transition conditions between three control modes.

FIG. 9 is a view schematically showing transition conditions of the three control modes. FIG. 10 is a view summarizing the main state parameters serving as an event to switch control modes.

Figure 10:
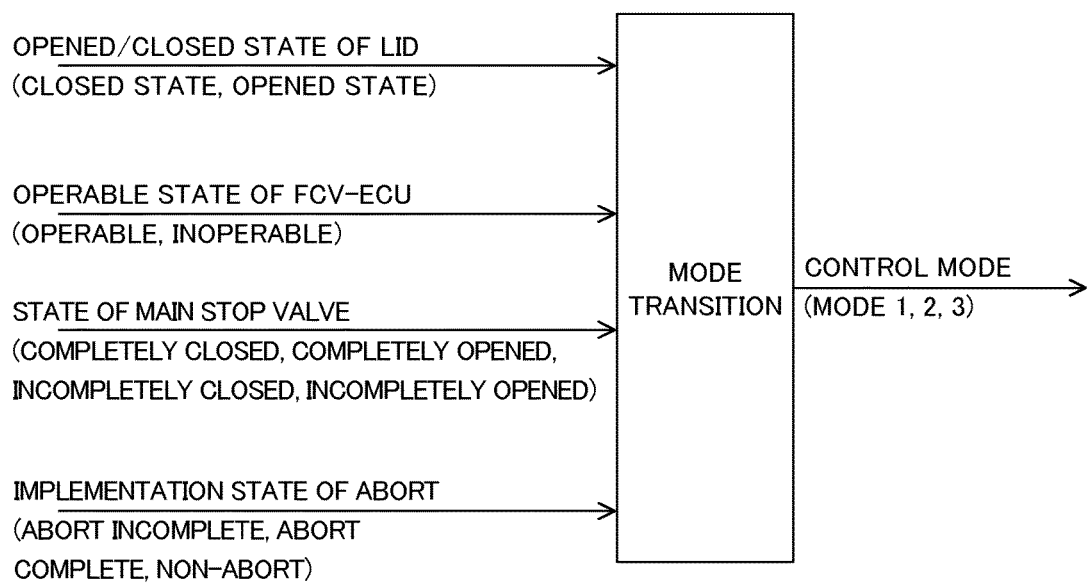
FIG. 10 is a view summarizing a plurality of state parameters establishing an event for switching control modes.

As shown in FIG. 10, the control mode is switched in response to the opened/closed state of the lid, operation state of the FCV-ECU, opened/closed state of the main stop valve, and abort implementation state. Herein, the opened/closed state of the lid is determined by the lid state determination unit 618 of the communicative filling ECU 61, the operation state of the FCV-ECU is determined by the ECU operation state determination unit 620 of the communicative filling ECU 61, the opened/closed state of the main stop valve is determined by the main stop valve state determination unit 619 of the communicative filling ECU 61, and the abort implementation state is determined by the abort implementation state determination unit 617 of the communicative filling ECU 61.

In the following explanation, the two ECUs 11 and 61 both being in inoperable states is referred to as vehicle stop state. In addition, in the vehicle stop state, the ignition switch is OFF, and the lid is closed.

As shown in FIG. 9, when the ignition switch is turned ON by the user from the vehicle stop state, the control mode becomes mode 1 (refer to path A in FIG. 9). In addition, when the lid is opened by the user from a state in which the fuel cell vehicle is stopped, the control mode becomes mode 2 (refer to path E in FIG. 9).

The user can startup from the vehicle stop state by way of the ignition switch or lid in the above way. However, in the case of starting up with the ignition switch, the control mode becomes mode 1, and the communicative filling ECU enters an operable state while functions relating to IR communication are limited (refer to FIG. 6). In addition, in a case of starting up with the lid, the control mode becomes mode 2, and the FCV-ECU does not enter an operable state.

First, a case of the control mode transitioning to mode 1 by starting up by way of the ignition switch (refer to path A in FIG. 9) will be explained. In mode 1, in response to having determined that the FCV-ECU is an inoperable state and the state of the lid is the closed state by way of the communicative filling ECU, the vehicle stop state is transitioned to (refer to path H in FIG. 9). This transitioning from mode 1 to the vehicle stop state, for example, corresponds to a case of the system stop processing having completed without starting communicative filling.

In addition, in response to having determined that the state of the main stop valve is the completely closed state and the state of the lid is the open state in mode 1, mode 3 is transitioned to (refer to path B in FIG. 9). This transitioning from mode 1 to mode 3, for example, corresponds to a case of an operation for starting communicative filling being performed while performing system stop processing. As mentioned above, communicative filling is executable only in mode 2 or 3, and cannot be executed in mode 1. Therefore, by including the matter of determining the main stop valve as being the completely closed state in one of the transition conditions from mode 1 to mode 3, the start of communicative filling is inhibited when it is determined as being a state in which the main stop valve is opened (state other than completely closed state). It is thereby possible to prevent communicative filling from being started while the main stop valve is opened and the state inside the hydrogen tank can fluctuate, a data signal for which the error is great from being sent to the hydrogen station side, and communicative filling from being started in a filling state that is not optimum based on a data signal for which the error thereof is great. It should be noted that, as shown in FIG. 6, although the communicative filling ECU inhibits the execution of IR communication in mode 1, the control of the filling shutoff valve is permitted. Therefore, although the user cannot perform communicative filling in mode 1, it is possible to perform non-communicative filling. In other words, non-communicative filling can be started without waiting for the main stop valve to be closed during system stop processing.

In mode 3 and mode 2, it is possible to perform communicative filling (refer to FIGS. 7 and 8). Therefore, after transitioning from mode 1 to mode 3, communicative filling is executed in response to an operation by the user. In mode 3, mode 2 is transitioned to in response to having determined by way of the communicative filling ECU that the FCV-ECU is inoperable (refer to path C in FIG. 9). This transition from mode 3 to mode 2 corresponds to a case of the FCV-ECU having become inoperable, for example, in response to dilution-during stop processing and cooling-during stop processing executed in mode 3 having ended.

In mode 2, the vehicle stop state is transitioned to in response to any of the following three transition conditions having been satisfied (refer to path D in FIG. 9). This transition from mode 2 to the vehicle stop state, for example, corresponds to a case of communicative filling having ended appropriately, a case of the lid having been opened in order to start communicative filling but the lid having been left open thereafter, etc. A first transition condition is determining by the communicative filling ECU that the abort implementation state is the abort complete state. A second transition condition is determining by the communicative filling ECU that the abort implementation state is the non-abort state and the lid state being the closed state. A third transition condition is determining by the communicative filling ECU that the abort implementation state is the non-abort state and the communication operation time having exceeded the time limit. By establishing the above such three conditions as transition conditions from mode 2 to the vehicle stop state, it is possible to inhibit the communicative filling ECU from transitioning from an operable state to inoperable state in a case of there being a possibility of abort processing being executed while performing communicative filling, or while executing abort processing. In other words, in a case of assuming abort processing having been started during filling, it is possible for this abort processing to reliably complete and enter the vehicle stop state. More specifically, for example, even in a case of the communication operation time exceeding the time limit immediately after a filling interruption request arising, it is possible to reliably end abort processing and enter the vehicle stop state.

Next, a case of the control mode transitioning to mode 2 by opening the lid (refer to path E in FIG. 9) will be explained. This transition from the vehicle stop state to mode 2 corresponds to a case of the user opening the lid in order to perform communicative filling. It is possible to perform communicative filling in mode 2 and mode 3 as mentioned above (refer to FIGS. 7 and 8). Therefore, after transitioning from the vehicle stop mode to mode 2, communicative filling is executed in response to an operation by the user. When any of the first to third transition conditions are satisfied in mode 2 as mentioned above, the control mode transitions from mode 2 to the vehicle stop state.

In addition, mode 2 transitions to mode 3 in response to having determined by the communicative filling ECU that the FCV-ECU is an operable state (refer to path F in FIG. 9). This transition from mode 2 to mode 3, for example, corresponds to a case of establishing the FCV-ECU in an operable state from an inoperable state, by the user turning the ignition switch ON while performing communicative filling. In mode 3, execution of system startup processing becomes possible (refer to FIG. 8). In other words, so long as being after starting communicative filling, the user can start system startup processing by operating the ignition switch. However, in this case, in order to prevent system startup processing and communicative filling accompanying valve opening of the main stop valve from being performed in parallel, communicative filling during execution is forcibly ended along with the start of system startup processing.

In addition, mode 3 transitions to mode 1 in response to having determined by the communicative filling ECU that the abort implementation state is any of the abort complete state and non-abort state, and the state of the main stop valve is a state other than the completely closed state and incompletely closed state (refer to path G in FIG. 9). In mode 1, IR communication is inhibited by the communicative filling ECU (refer to FIG. 6). Therefore, by setting the transition conditions from mode 3 to mode 1 as mentioned above, it is possible to prevent IR communication from suspending in the case of there being a possibility of abort processing being executed while performing communicative filling, or while executing the abort processing. In other words, in a case of assuming abort processing has been started during filling, it is possible for this abort processing to reliably complete, and then establish the vehicle in a state capable of travel.

Although an embodiment of the present invention has been explained above, the present invention is not to be limited thereto.

For example, in the above-mentioned embodiment, a case has been explained in which the main stop valve state determination unit 114 determines the opened/closed state of the main stop valve 312 based on a detection signal from the main stop valve sensor 317 in addition to an open/close command signal for the main stop valve 312; however, the present invention is not limited thereto. The present invention can also be applied to a fuel cell vehicle not equipped with a main stop valve sensor 317.

In this case, it is preferable for the main stop valve state determination unit to determine being an incompletely closed state in a period from a close command for the main stop valve being outputted from any of the system startup unit, normal electric power generation unit and system stop unit until a predetermined completely closed determination time elapses, and to determine as being the completely closed state after the elapse of the above-mentioned completely closed state time. In addition, it is preferable for the main stop valve state determination unit to determine as being the incompletely opened state in a period from an open command for the main stop valve being outputted from any of the system startup unit, normal electric power generation unit and system stop unit until a predetermined completely opened determination time elapses, and to determine as being the completely opened state after the elapse of the above-mentioned completely opened determination time.

For example, in the above-mentioned embodiment, a case has been explained in which the present invention is applied to a fuel cell vehicle that travels using electric power generated by a fuel cell system; however, the present invention can also be applied to a moving body such as the following such natural gas automobile and hydrogen automobile.

A natural gas automobile is equipped with a power generation system and a communicative filling system. The power generation system includes an engine that generates motive power using natural gas as the fuel gas, a storage vessel that stores the natural gas, a natural gas supply line that connects the storage vessel and an injector of the engine, and an on-off valve provided in the natural gas supply line. The communicative filling system includes a signal generation device that generates data signals based on the state of the storage vessel, and a transmitter that sends the data signals thus generated to an external filling device that fills natural gas into the storage vessel. The natural gas automobile includes a power generation system control unit that executes processing related to the startup and stop of the power generation system, a communicative filling system control unit that executes processing related to communication with the external filling device by way of the communicative filling system, an on-off valve state determination unit that determines whether the on-off valve is an opened state or a closed state, in which the power generation system control unit and communicative filling system control unit are intercommunicable, and the communicative filling system control unit inhibits the start of communication by the transmitter when determining as being the opened state by way of at least the on-off valve state determination unit, except while filling natural gas from the external filling device to the storage vessel.

The hydrogen automobile includes a power generation system and a communicative filling system. The power generation system includes an engine that generates motive power using hydrogen as the fuel gas, a storage vessel that stores the hydrogen, a hydrogen supply line that connects the storage vessel and an injector of the engine, and an on-off valve provided in the hydrogen supply line. The communicative filling system includes a signal generation device that generates data signals based on the state of the storage vessel, and a transmitter that sends the data signals thus generated to an external filling device that fills hydrogen into the storage vessel. The hydrogen automobile includes a power generation system control unit that executes processing related to the startup and stop of the power generation system, a communicative filling system control unit that executes processing related to communication with the external filling device by way of the communicative filling system, an on-off valve state determination unit that determines whether the on-off valve is an opened state or a closed state, in which the power generation system control unit and communicative filling system control unit are intercommunicable, and the communicative filling system control unit inhibits the start of communication by the transmitter when determining as being the opened state by way of at least the on-off valve state determination unit, except while filling hydrogen from the external filling device to the storage vessel.

The above such natural gas automobile and hydrogen automobile share in common with the fuel cell vehicle explained in the above-mentioned embodiment the aspect of traveling using fuel gas stored in a storage vessel, the aspect of requiring filling the fuel gas into the storage vessel in order to travel, etc. Therefore, the present invention can also be applied to moving bodies such as the above such natural gas automobile and hydrogen automobile.

In the above-mentioned embodiment, an example of establishing the storage vessel that stores hydrogen as a high-pressure tank has been explained; however, it is not limited thereto, and a hydrogen tank equipped with a storage alloy may be established as the storage vessel.

In the above-mentioned embodiment, an example has been explained in which a module related to the execution of fuel cell system processing (system startup processing, normal electric power generation, etc.) and a module related to the execution of communicative filling system processing (data signal generation processing, IR communication processing, etc.) are configured in respectively separate ECUs 11 and 61; however, the present invention is not limited thereto. For example, so long as communication is possible between the above-mentioned two modules, these may be configured in the same ECU.

What is claimed is:

1. A fuel cell vehicle that travels using a fuel cell as an electric power source, comprising: a fuel cell system including a fuel cell that generates electric power when fuel gas and an oxidant gas are supplied thereto, a storage vessel that stores fuel gas, a fuel gas supply line that connects the storage vessel and the fuel cell, an on-off valve provided to the fuel gas supply line, and a main stop valve sensor;

a communicative filling system including a signal generation device that generates a data signal based on a state of the storage vessel, and a transmitter that sends the data signal generated by the signal generation device to an external filling device that fills fuel gas to the storage vessel;

a fuel cell system control unit that executes fuel cell system processing related to electric power generation by the fuel cell, and startup and stop of the fuel cell system;

a communicative filling system control unit that executes processing related to data communication with the external filling device by the communicative filling system; and an on-off valve state determination unit that determines whether the on-off valve is an opened state or closed state, wherein the fuel cell system control unit and the communicative filling system control unit are intercommunicable, wherein the communicative filling system control unit inhibits start of data communication with the external filling device by the transmitter when determined by way of at least the on-off valve state determination unit as being the opened state, and wherein the main stop valve sensor is configured to detect the opened state or closed state of the on-off valve, and is connected to the on-off valve state determination unit.

2. The fuel cell vehicle according to claim 1, characterized by comprising:

a fuel introduction part to which a fuel filler nozzle of the external filling device is connected;

a fuel introduction line that connects the fuel introduction part and the storage vessel; and an accepting mechanism that is provided in the fuel introduction line, and accepts or rejects supply of fuel gas from the external filling device to the storage vessel, wherein the communicative filling system control unit accepts supply of fuel gas by the accepting mechanism in a case of a predetermined filling start request occurring while data communication by the transmitter is being inhibited, and permits non-communicative filling allowing fuel gas to be filled at a predetermined flow rate by the external filling device while inhibiting data communication by the transmitter.

3. The fuel cell vehicle according to claim 1, characterized in that sending the data signal from the transmitter to the external filling device and filling fuel gas to the storage vessel in a mode decided based on the data signal from the transmitter is defined as communicative filling;

the communicative filling system control unit monitors a state of the storage vessel while performing the communicative filling, determines whether being filled in a specific mode, and starts abort processing to cause the communicative filling to be interrupted in a case of determining as being filled in a mode different from the specific mode; and the communicative filling system control unit is inhibited from transitioning from an operable state to an inoperable state, in a case of there being a possibility of the abort processing being executed or a case of executing the abort processing.

4. The fuel cell vehicle according to claim 1, characterized by further comprising:

a pressure sensor that detects a pressure of the storage vessel; and a temperature sensor that detects a temperature of the storage vessel, wherein detection signals of the pressure sensor and the temperature sensor are inputted only to the communicative filling system control unit, and wherein the communicative filling system control unit sends the detection signal or a signal generated based on the detection signal to the fuel cell system control unit.

5. The fuel cell vehicle according to claim 1, characterized by further comprising a system startup request device that generates a startup request signal for the fuel cell system, wherein sending the data signal from the transmitter to the external filling device and filling fuel gas to the storage vessel in a mode decided based on the data signal from the external filling device is defined as communicative filling, and wherein the communicative filling system control unit ends communicative filling during execution and the fuel cell system control unit begins startup of the fuel cell system in a case of the startup request signal occurring while performing the communicative filling.

6. The fuel cell vehicle according to claim 2, characterized in that sending the data signal from the transmitter to the external filling device and filling fuel gas to the storage vessel in a mode decided based on the data signal from the transmitter is defined as communicative filling;

the communicative filling system control unit monitors a state of the storage vessel while performing the communicative filling, determines whether being filled in a specific mode, and starts abort processing to cause the communicative filling to be interrupted in a case of determining as being filled in a mode different from the specific mode; and the communicative filling system control unit is inhibited from transitioning from an operable state to an inoperable state, in a case of there being a possibility of the abort processing being executed or a case of executing the abort processing.

7. The fuel cell vehicle according to claim 6, characterized by further comprising:

a pressure sensor that detects a pressure of the storage vessel; and a temperature sensor that detects a temperature of the storage vessel, wherein detection signals of the pressure sensor and the temperature sensor are inputted only to the communicative filling system control unit, and wherein the communicative filling system control unit sends the detection signal or a signal generated based on the detection signal to the fuel cell system control unit.

8. The fuel cell vehicle according to claim 7, characterized by further comprising a system startup request device that generates a startup request signal for the fuel cell system, wherein sending the data signal from the transmitter to the external filling device and filling fuel gas to the storage vessel in a mode decided based on the data signal from the external filling device is defined as communicative filling, and wherein the communicative filling system control unit ends communicative filling during execution and the fuel cell system control unit begins startup of the fuel cell system in a case of the startup request signal occurring while performing the communicative filling.

9. A moving body that travels using power generated by a power generation device, characterized by comprising:

a power generation system including a power generation device that generates power using fuel gas, a storage vessel that stores fuel gas, a fuel gas supply line that connects the storage vessel and the power generation device, an on-off valve provided to the fuel gas supply line, and a main stop valve sensor;

a communicative filling system including a signal generation device that generates a data signal based on a state of the storage vessel, and a transmitter that sends the data signal generated by the signal generation device to an external filling device that fills fuel gas into the storage vessel;

a power generation system control unit that executes processing related to startup and stop of the power generation system;

a communicative filling system control unit that executes processing related to data communication with the external filling device by way of the communicative filling system; and an on-off valve state determination unit that determines whether the on-off valve is an opened state or closed state, wherein the power generation system control unit and the communicative filling system control unit are intercommunicable, wherein the communicative filling system control unit inhibits start of data communication by the transmitter when determined as being the opened state at least according to the on-off valve state determination unit, except while filling fuel gas from the external filling device to the storage vessel, and wherein the main stop valve sensor is configured to detect the opened state or closed state of the on-off valve, and is connected to the on-off valve state determination unit.

10. The fuel cell vehicle according to claim 7, wherein the data communication with the external filling device is communicated by infrared from the transmitter.

11. The moving body according to claim 9, wherein the data communication with the external filling device is communicated by infrared from the transmitter.

* * * * *